US011021148B2

(12) United States Patent
Ghafarianzadeh et al.

(10) Patent No.: US 11,021,148 B2
(45) Date of Patent: Jun. 1, 2021

(54) PEDESTRIAN PREDICTION BASED ON ATTRIBUTES

(71) Applicant: Zoox, Inc., Foster City, CA (US)

(72) Inventors: Mahsa Ghafarianzadeh, Emerald Hills, CA (US); Luke Martin Hansen, San Francisco, CA (US)

(73) Assignee: Zoox, Inc., Foster, CA (US)

( * ) Notice: Subject to any disclaimer, the term of this patent is extended or adjusted under 35 U.S.C. 154(b) by 262 days.

(21) Appl. No.: 16/363,541

(22) Filed: Mar. 25, 2019

(65) Prior Publication Data

US 2020/0307562 A1    Oct. 1, 2020

(51) Int. Cl.
*B60W 30/09* (2012.01)
*B60W 30/095* (2012.01)
*G06N 20/00* (2019.01)
*G06K 9/00* (2006.01)
*G06N 5/04* (2006.01)

(52) U.S. Cl.
CPC ........ *B60W 30/09* (2013.01); *B60W 30/0956* (2013.01); *G06K 9/00348* (2013.01); *G06K 9/00805* (2013.01); *G06N 5/046* (2013.01); *G06N 20/00* (2019.01)

(58) Field of Classification Search
CPC .................................................... B60W 30/09
See application file for complete search history.

(56) References Cited

U.S. PATENT DOCUMENTS

| 7,418,372 B2 * | 8/2008 | Nishira ................ B60K 31/047 703/2 |
| 8,543,261 B2 * | 9/2013 | Anderson ............. B60W 30/09 701/3 |
| 10,118,610 B2 * | 11/2018 | Deng ................... B60W 10/20 |

(Continued)

FOREIGN PATENT DOCUMENTS

GB        2556146 A   *   5/2018   ............ B60W 30/09

OTHER PUBLICATIONS

Bonnin et al, "Pedestrian Crossing Prediction using Multiple Context-based Models", 17th International IEEE Conference on Intelligent Transportation Systems (ITSC), IEEE, Oct. 8, 2014, pp. 378-385.

(Continued)

*Primary Examiner* — Alex C Dunn
(74) *Attorney, Agent, or Firm* — Lee & Hayes, P.C.

(57) ABSTRACT

Techniques are discussed for predicting locations of an object based on attributes of the object and/or attributes of other object(s) proximate to the object. The techniques can predict locations of a pedestrian proximate to a crosswalk as they traverse or prepare to traverse through the crosswalk. The techniques can predict locations of objects as the object traverses an environment. Attributes can comprise information about an object, such as a position, velocity, acceleration, classification, heading, relative distances to regions or other objects, bounding box, etc. Attributes can be determined for an object over time such that, when a series of attributes are input into a prediction component (e.g., a machine learned model), the prediction component can (Continued)

output, for example, predicted locations of the object at times in the future. A vehicle, such as an autonomous vehicle, can be controlled to traverse an environment based on the predicted locations.

20 Claims, 12 Drawing Sheets

(56) References Cited

U.S. PATENT DOCUMENTS

| | | | | |
|---|---|---|---|---|
| 10,282,789 | B1* | 5/2019 | Myers | G06K 9/00275 |
| 10,421,453 | B1* | 9/2019 | Ferguson | B60W 60/0027 |
| 2005/0285774 | A1* | 12/2005 | Wittenberg | G01S 13/726 |
| | | | | 342/70 |
| 2015/0232073 | A1* | 8/2015 | Fujishiro | B60T 7/22 |
| | | | | 701/70 |
| 2015/0298621 | A1* | 10/2015 | Katoh | G08G 1/165 |
| | | | | 348/148 |
| 2018/0018524 | A1* | 1/2018 | Yao | G06K 9/00362 |
| 2018/0056995 | A1* | 3/2018 | Deng | B60W 10/184 |
| 2018/0074507 | A1* | 3/2018 | Gao | G05D 1/0088 |
| 2018/0099663 | A1* | 4/2018 | Diedrich | B60W 30/09 |
| 2018/0222476 | A1* | 8/2018 | Ishii | G01S 17/931 |
| 2020/0086854 | A1* | 3/2020 | Liu | B60W 30/09 |
| 2020/0110416 | A1* | 4/2020 | Hong | G06N 20/00 |
| 2020/0143238 | A1* | 5/2020 | Ramnath | G06K 9/00677 |
| 2020/0307563 | A1* | 10/2020 | Ghafarianzadeh | |
| | | | | B60W 60/00274 |

OTHER PUBLICATIONS

Karasev et al, "Intent-aware long-term prediction of pedestrian motion", 2016 IEEE International Conference on Robotics and Automation (ICRA), IEEE, May 16, 2016, pp. 2543-25499.

Kooij, "Context-Based Pedestrian Path Prediction",12th European Conference on Computer Vision, ECCV 2012, [Lecture Notes in Computer Science], Jun. 1, 2014, pp. 618-633.

The PCT Search Report and Written Opinion dated Jul. 7, 2020 for PCT Application No. PCT/US2020/024386, 13 pages.

Schneemann et al, "Context-based Detection of Pedestrian Crossing Intention for Autonomous Driving in Urban Environments", 2016 IEEE/RSJ Internation Conference on Intelligent Robots and Systems (IROS), IEEE, Oct. 9, 2016, pp. 2243-2248.

Suzuki et al, "Sensor Fusion-Based Pedestrian Collision Warning System with Crosswalk Detection", Intelligent Vehicles Symposium (IV), 2010 IEEE, IEEE, Jun. 21, 2010, pp. 355-360.

* cited by examiner

Attribute(s) (e.g., per object) 702

- Velocity
- Acceleration
- X-Position
- Y-Position
- Bounding Box
- Lighting State(s)
- Map Element(s)
- Object Classification
  ⋮
- Object Characteristic(s)

PEDESTRIAN PREDICTION BASED ON ATTRIBUTES

BACKGROUND

Prediction techniques can be used to determine future states of entities in an environment. That is, prediction techniques can be used to determine how a particular entity is likely to behave in the future. Current prediction techniques often involve physics-based modeling or rules-of-the-road simulations to predict future states of entities in an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
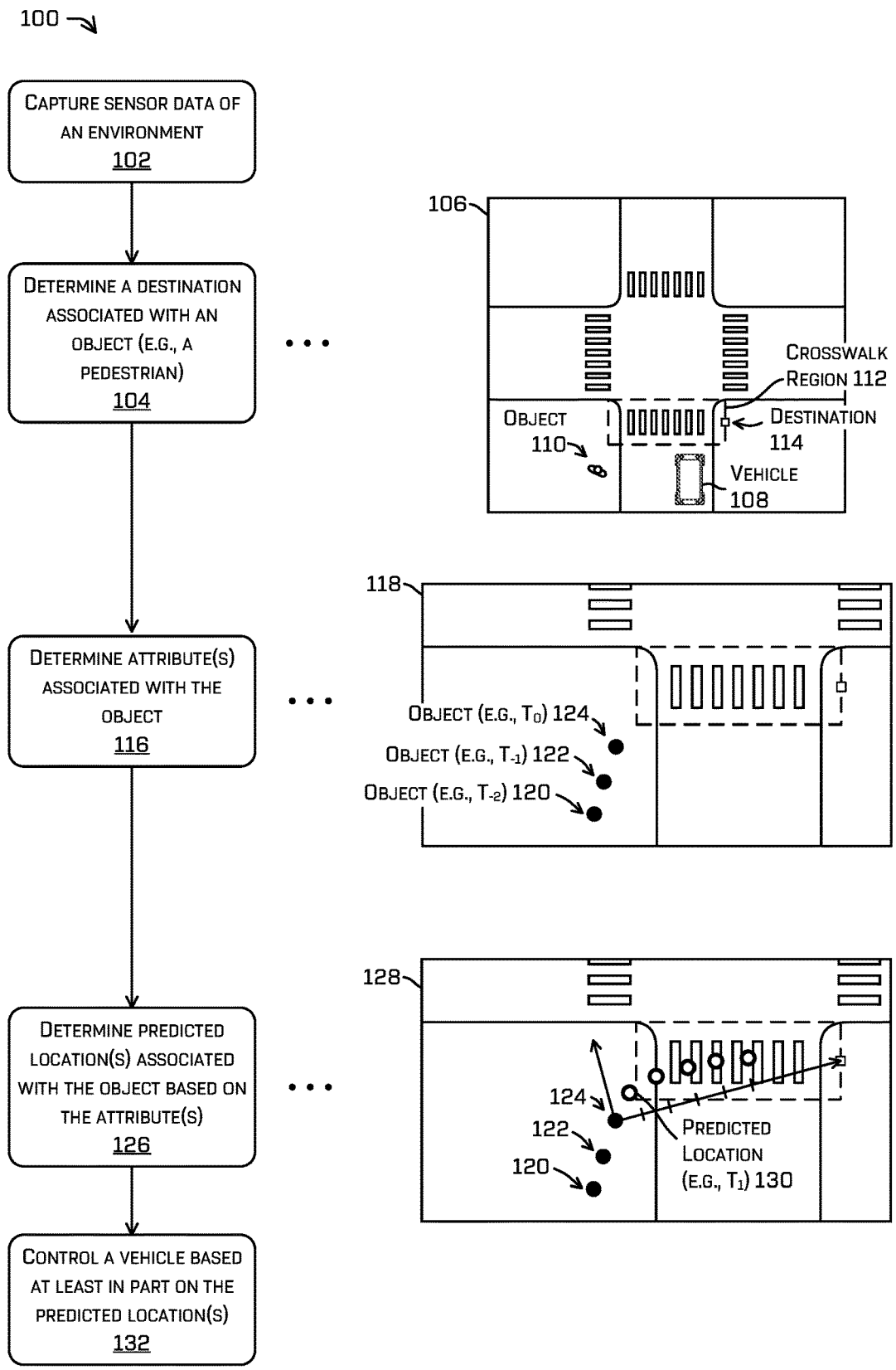
FIG. 1 is a pictorial flow diagram of an example process for capturing sensor data, determining attributes associated with an object, determining a predicted location based on the attributes, and controlling a vehicle based on the predicted location.

This disclosure is directed to techniques for predicting locations of an object based on attributes of the object and/or based on attributes of other object(s) proximate to the object. In a first example, the techniques discussed herein can be implemented to predict locations of a pedestrian proximate to a crosswalk region in an environment as they traverse or prepare to traverse through the crosswalk region. In a second example, the techniques discussed herein can be implemented to predict locations of objects (e.g., a vehicle) as the vehicle traverses an environment. For example, predicted locations of the vehicle can be based on attributes of the vehicle as well as attributes of other vehicles proximate to the vehicle in the environment. Attributes can comprise information about an object, including but not limited to a position, velocity, acceleration, bounding box, etc. Attributes can be determined for an object over time (e.g., times $T_{-M}, \ldots, T_{-2}, T_{-1}, T_0$) such that, when input to a prediction component (e.g., a machine learned model such as a neural network), the prediction component can output predictions (e.g., predicted locations of the object) at times in the future (e.g., times $T_1, T_2, T_3, \ldots, T_N$). A vehicle, such as an autonomous vehicle, can be controlled to traverse an environment based at least in part on the predicted locations of the object(s).

As introduced above, and in a first example, the techniques discussed herein can be implemented to predict locations of a pedestrian proximate to a crosswalk region in an environment as the pedestrian traverses through or prepares to traverse through the crosswalk region. For example, sensor data can be captured in an environment, and an object can be identified and classified as a pedestrian. Further, a crosswalk region can be identified in the environment based on map data and/or based on sensor data (e.g., identifying a crosswalk region from sensor data, whether directly by observing visual indicators of a crosswalk region (stripes, crosswalk signs, etc.) or indirectly by historical detections of pedestrians crossing a road at such a location). At least one destination can be associated with a crosswalk region. For example, in a case where a pedestrian is on a sidewalk proximate to a crosswalk, a destination can represent an opposite side of the street in the crosswalk region. In a case where a pedestrian is in a street (either inside or outside of the crosswalk region), a destination can be selected or otherwise determined based on attributes of the pedestrian (e.g., position, velocity, acceleration, heading, etc.). In the case of multiple crosswalk regions proximate one another, a score associated with a likelihood that the pedestrian will cross a particular crosswalk can be based on attributes of the pedestrian (e.g., position, velocity, acceleration, heading, etc.). A crosswalk region associated with a highest score can be selected or otherwise determined to be a target crosswalk associated with the pedestrian.

In some examples, as in the case of jaywalking or crossing a road where a crosswalk region is not readily identifiable, a destination associated with a pedestrian can be determined based on a number of factors. For example, a destination can be determined based at least in part on one or more of: a straight line extrapolation of a velocity of a pedestrian, a nearest location of a sidewalk region associated with a pedestrian, a gap between parked vehicles, an open door associated with a vehicle, and the like. In some examples, sensor data can be captured of an environment to determine a likelihood of these example candidate destinations being present in an environment. In some examples, a score can be associated with each candidate destination and a likely destination can be used in accordance with the techniques discussed herein.

When a crosswalk region (or other location) has been determined to be a destination of a pedestrian, the techniques can include predicting location(s) of the pedestrian over time to traverse the crosswalk region. In some examples, attributes for the object can be determined over time (e.g., times $T_{-M}, \ldots, T_{-2}, T_{-1}, T_0$), whereby the attributes can be represented in a frame of reference associated with the object at time $T_0$. That is, a position of the object at $T_0$ can be considered to be an origin (e.g., coordinates (0, 0) in an x-y coordinate system)), whereby a first axis can be defined by the origin and a destination associated with the crosswalk region. In some examples, other points can be considered as an origin for another frame of reference. As noted above, in the case where a pedestrian is on a first side of a street, the destination associated with the crosswalk region can be selected as a point on a second side of the street opposite the first side of the street, although any destination can be selected. A second axis of the frame of reference can be perpendicular to the first axis and, in at least some examples, lie along the plane containing the crosswalk region.

In some examples, attributes of the pedestrian can be determined based on sensor data captured over time, and can include, but are not limited to, one or more of a position of the pedestrian at a time (e.g., wherein the position can be represented in the frame of reference discussed above), a velocity of the pedestrian at the time (e.g., a magnitude and/or angle with respect to the first axis (or other reference line)), an acceleration of the pedestrian at the time, an indication of whether the pedestrian is in a drivable area (e.g., whether the pedestrian is on a sidewalk or a road), an indication of whether the pedestrian is in a crosswalk region, a region control indicator state (e.g., whether the intersection is controlled by a traffic signal and/or whether the crosswalk is controlled by a traffic signal (e.g., walk/don't walk) and/or a state of the traffic signal), a vehicle context (e.g., a presence of a vehicle in the environment and attribute(s) associated with the vehicle), a flux through the crosswalk region over a period of time (e.g., a number of objects (e.g., vehicles) through the crosswalk region over a period of time), an object association (e.g., whether the pedestrian is travelling in a group of pedestrians), a distance to the crosswalk in a first direction (e.g., a global x-direction or an x-direction distance based on the frame of reference), a distance to a crosswalk in a second direction (e.g., a global y-direction or a y-direction distance based on the frame of reference), a distance to the road in the crosswalk region (e.g., a shortest distance to the road within the crosswalk region), pedestrian hand gestures, pedestrian gaze detection, an indication of whether the pedestrian is standing, walking, running, etc., whether other pedestrians are in the crosswalk, a pedestrian crosswalk flux (e.g., a number of pedestrians travelling through the crosswalk (e.g., across the drivable area) over a period of time), a ratio of a first number of pedestrians on a sidewalk (or a non-drivable area) and a second number of pedestrians in the crosswalk region (or a drivable area), variances, confidences, and/or probabilities associated with each attribute, and the like.

Attributes can be determined over time (e.g., at times $T_{-M}, \ldots, T_{-2}, T_{-1}, T_0$ (where M is an integer) which may represent any time(s) prior to, and/or including, a current time, such as, but not limited to, 0.01 seconds, 0.1 seconds, 1 second, 2 seconds, etc.)) and input to a prediction component to determine predicted locations of the pedestrian. In some examples, the prediction component is a machine learned model such as a neural network, a fully connected neural network, a convolutional neural network, a recurrent neural network, and the like.

In some examples, the prediction component can output information associated with the pedestrian in the future. For example, the prediction component can output predicted information associated with times in the future (e.g., times $T_1, T_2, T_3, \ldots, T_N$ (where N is an integer) which represent any time(s) after a current time). In some examples, the predicted information can comprise predicted location(s) of the pedestrian at future times. For example, a predicted location can be represented in the frame of reference as a distance between the origin (e.g., the location of the pedestrian at $T_0$) and the pedestrian at $T_1$ (e.g., a distance s) and/or as a lateral offset ($e_y$) relative to the first axis (e.g., relative to the reference line). In some examples, the distance s and/or the lateral offset $e_y$ can be represented as rational numbers (e.g., 0.1 meter, 1 meter, 1.5 meters, etc.). In some examples, the distance s and/or the lateral offset can be binned (e.g., input to a binning algorithm) to discretize the original data values into one or many discrete intervals. In some examples, bins for the distance s can be 0-1 meters, 1-2 meters, 3-4 meters, and the like, although any regular or irregular interval can be used for such bins.

In some examples, a vehicle, such as an autonomous vehicle, can be controlled to traverse an environment based at least in part on the predicted locations of the pedestrian(s).

As introduced above, and in a second example, the techniques discussed herein can be implemented to predict locations of objects (e.g., a vehicle) as the vehicle traverses an environment. For example, sensor data can be captured in an environment, and an object can be identified and classified as a vehicle. Further, a reference line can be identified and associated with the vehicle based on map data (e.g., identifying a drivable area such as a lane) and/or based on sensor data (e.g., identifying a drivable area or lane from sensor data). As can be understood, an environment may include any number of objects. For example, a target object or target vehicle (e.g., a vehicle the subject of such prediction techniques) may be traversing an environment where there are other vehicles that are proximate the target vehicle. In some examples, the techniques may include identifying the nearest K objects to the target object (where K is an integer). For example, the techniques may include identifying the nearest 5 vehicles or other objects to the target vehicle, although any number of vehicles or other objects can be identified or otherwise determined. In some examples, the techniques may include identifying objects that a within a threshold distance to the target object. In some examples, the vehicle capturing sensor data may be identified as one of the objects that is proximate the target vehicle. In at least some examples, additional characteristics may be used to determine which objects to consider. As non-limiting examples, objects travelling in an opposing direction, on an opposite side of a divided road, objects having a particular classification (e.g., other than vehicle), etc. may be disregarded when considering the K nearest objects.

In some examples, attributes can be determined for the target object and/or other object(s) that are proximate the target object. For example, attributes can include, but are not limited to, one or more of a velocity of the object at a time, an acceleration of the object at the time, a position of the object at the time (e.g., in global or local coordinates), a bounding box associated with the object at the time (e.g., representing extent(s) of the object, roll, pitch, and/or yaw), a lighting state associated with the object at the first time (e.g., headlight(s), braking light(s), hazard light(s), turn indicator light(s), reversing light(s), etc.), a wheel orientation of a vehicle, a distance between the object and a map element at the time (e.g., a distance to a stop line, traffic line, speed bump, yield line, intersection, driveway, etc.), a classification of the object (e.g., car, vehicle, animal, truck, bicycle, etc.), a characteristic associated with the object (e.g., whether the object is changing lanes, is a double parked vehicle, etc.), lane types (e.g., direction of a lane, parking lane), road markings (e.g., indicative of whether passing or lane changes are permitted, etc.), and the like.

In some examples, attribute information associated with the target object and/or other objects that are proximate to the target object can be captured over time and can be input to a prediction component to determine predicted information associated with the target object. In some instances, the predicted information can represent a predicted location of the target at various time intervals (e.g., a predicted location at times $T_1, T_2, T_3, \ldots, T_N$).

In some examples, the predicted location(s) can be compared to candidate reference lines in the environment to determine a reference line associated with the target object. For example, an environment may include two lanes which may be eligible (e.g., legal) drivable areas for the target vehicle to traverse. Further, such drivable areas may be associated with a representative reference line (e.g., a center of a lane or drivable area). In some examples, the predicted location(s) can be compared to the reference line(s) to determine a similarity score between the predicted location(s) and the candidate reference line(s). In some examples, a similarity score can be based at least in part on a distance between a predicted location and a reference line, and the like. In some examples, attributes associated with an object (e.g., at times $T_{-M}, T_-, T_0$) can be input to a reference line prediction component which can output a likely reference line associated with the object. The techniques can include receiving, selecting, or otherwise determining a reference line and representing the predicted location(s) with respect to the reference line in the environment. That is, the predicted location(s) can be represented as a distance s along the reference line representing a distance between a location of the target at time $T_0$ and a predicted location of the target object at a future time (e.g., time $T_1$). A lateral offset $e_y$ can represent a distance between the reference line and a point intersecting with a line that is perpendicular to a tangent line associated with the reference line.

The prediction techniques can be repeated iteratively or in parallel to determine predicted location(s) associated with objects in the environment. That is, a first target object may be associated with a first subset of objects in an environment, and a second target object may be associated with a second subset of objects in the environment. In some instances, the first target object may be included in the second subset of objects, while the second target object may be included in the first subset of objects. Thus, predicted locations can be determined for a plurality of objects in an environment. In some cases, the predicted locations can be determined substantially simultaneously, within technical tolerances.

In some examples, a vehicle, such as an autonomous vehicle, can be controlled to traverse an environment based at least in part on the predicted locations of the object(s). For example, such predicted location(s) can be input to a planning component of the vehicle to traverse an environment with an understanding of the predicted location(s) of the objects in the environment.

The techniques discussed herein can improve a functioning of a computing device, such as a computing device of an autonomous vehicle, in a number of additional ways. In some examples, determining attributes and inputting the attributes into a prediction component such as a machine learned component can obviate hard-coded rules that may otherwise inflexibly represent an environment. In some cases, determining predicted location(s) associated with objects in an environment (e.g., pedestrians or vehicles) can allow other vehicles or objects to better plan trajectories that ensure safe and comfortable movement through an environment. For example, predicted location(s) suggesting a likelihood of a collision or a near-collision may allow an autonomous vehicle to alter a trajectory (e.g., change lanes, stop, etc.) in order to safely traverse the environment. These and other improvements to the functioning of computing devices are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver controlled vehicles in which such a system may provide an indication of whether it is safe to perform various maneuvers. In another example, the techniques can be utilized in a manufacturing assembly line context, or in an aerial surveying context. Additionally, the techniques described herein can be used with real data (e.g., captured using sensor(s)), simulated data (e.g., generated by a simulator), or any combination of the two.

FIG. 1 is a pictorial flow diagram of an example process 100 for capturing sensor data, determining attributes associated with an object, determining a predicted location based on the attributes, and controlling a vehicle based on the predicted location.

At operation 102, the process can include capturing sensor data of an environment. In some examples, the sensor data can be captured by one or more sensors on a vehicle (autonomous or otherwise). For example, the sensor data can include data captured by a lidar sensor, an image sensor, a radar sensor, a time of flight sensor, a sonar sensor, and the like. In some examples, the operation 102 can include determining a classification of an object (e.g., to determine that an object is a pedestrian in an environment).

At operation 104, the process can include determining a destination associated with an object (e.g., a pedestrian). An example 106 illustrates a vehicle 108 and an object 110 (e.g., a pedestrian) in the environment. In some examples, the vehicle 108 can perform the operations discussed in the process 100.

The operation 104 can include determining attributes of the object 110 to determine a location, velocity, heading, etc. of the object 110. Further, the operation 104 can include accessing map data to determine whether a crosswalk region (e.g., crosswalk region 112) is present in the environment. In some examples, the crosswalk region 112 can represent a perimeter of a crosswalk in an environment. In some examples, the operation 104 can include determining that the object is within a threshold distance (e.g., 5 meters) of a portion of the crosswalk region 112. In some examples, the threshold distance may be considered to be a minimum distance from the object to any portion of the crosswalk region. If the object 110 is within a threshold distance of multiple crosswalk regions in the environment, the operation 104 can include determining a probability or score associated with the pedestrian (e.g., the object 110) crossing a respective crosswalk region and selecting a most likely crosswalk region. In some instances, a destination 114 can be associated with the crosswalk region 112. In some examples, the destination 114 can represent a center or a midpoint of a side of the crosswalk region 112 that is opposite a location of the object 110, although the destination 114 can represent any point in the environment associated with the crosswalk region 112. Additional details of determining a destination are discussed in connection with FIGS. 3A and 3B, as well as throughout this disclosure.

At operation 116, the process can include determining attribute(s) associated with the object. As illustrated in example 118, attributes can be determined for the object 110 at various instances in time up to and including a most recent time associated with the attributes (e.g., at times $T_{-M}, \ldots, T_{-2}, T_{-1}, T_0$). The object 110 can be referred to as an object 120 (e.g., at time $T_{-2}$), as object 122 (e.g., at time $T_{-1}$), and as object 124 (e.g., a time $T_0$). In some examples, time $T_0$ may represent a time at which data is input to a prediction component (discussed below), time $T_{-1}$ may represent 1 second before time $T_0$, and time $T_{-2}$ may represent 2 seconds before time $T_0$. However, it can be understood that times $T_0$, $T_{-1}$, and $T_{-2}$ can represent any time instances and/or periods of time. For example, time $T_{-1}$ may represent 0.1 seconds before time $T_0$, and time $T_{-2}$ may represent 0.2 seconds before time $T_0$. In some examples, attributes determined in the operation 116 can include, but are not limited to, information about the objects 120, 122, and/or 124. For example, a velocity attribute associated with the object 120 may represent a velocity of the object 120 at time $T_{-2}$. A velocity attribute associated with the object 122 may represent a velocity of the object at time $T_{-1}$. And a velocity attribute associated with the object 124 may represent a velocity of the object at time $T_0$. In some examples, some or all of the attributes may be represented in a frame of reference relative to the object 124 (e.g., the object 110 at time $T_0$) and the destination 114. In such examples, there may be three unique reference frames associated with each prior time step ($T_{-M}$ to $T_0$) and each attribute may be associated with the reference frame of that particular time. Additional details of attributes are discussed in connection with FIG. 2, as well as throughout this disclosure.

At operation 126, the process can include determining predicted location(s) associated with the object based on the attribute(s). An example 128 illustrates a predicted location 130 (e.g., a predicted location of the object 110 at time $T_1$, which is a time after $T_0$). In some examples, as the operation 126 can be performed at or near time $T_0$, the predicted location 130 at time $T_1$ can represent a location of the object 110 in the future. As can be understood, in some examples, the operation 126 can include determining predicted locations for a plurality of times associated with the object 124 in the future. For example, the operation 126 can include determining predicted locations of the object at times $T_1, T_2, T_3, \ldots, T_N$, where N is an integer representing times, e.g., 1 second, 2 seconds, 3 seconds, etc. in the future. In some examples, the predicted location(s) can be represented as a distance s along a reference line and a lateral offset $e_y$ from the reference line. In at least some examples, the distance, s, and offset, $e_y$, may be relative to a relative coordinate system defined at each time step and/or relative to the last determined reference frame. Additional details of determining the predicted location(s) are discussed in connection with FIGS. 4 and 5, as well as throughout this disclosure.

In some examples, the operations 102, 104, 116, and/or 126 can be performed iteratively or repeatedly (e.g., at each time step, at a frequency of 10 Hz, etc.), although the process 100 can be performed at any interval or at any time.

At operation 132, the process can include controlling a vehicle based at least in part on the predicted location(s). In some examples, the operation 132 can include generating a trajectory for the vehicle 108 to follow (e.g., to stop before the intersection and/or before the crosswalk region 112 to allow the pedestrian 110 to traverse through the crosswalk region 112 to the destination 114).

Figure 2:
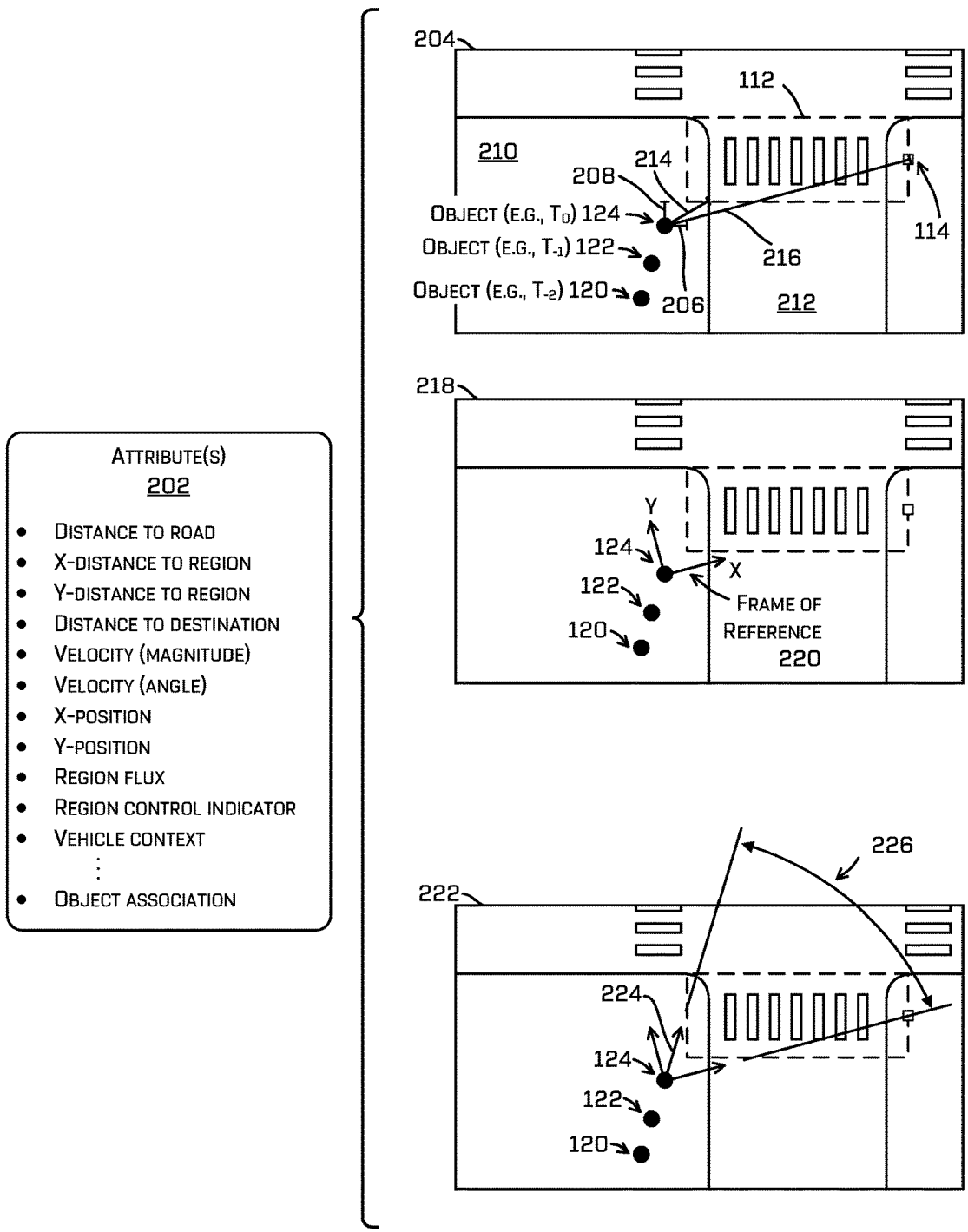
FIG. 2 illustrates examples of attributes of an object.

FIG. 2 illustrates examples 200 of attributes of an object. In some instances, attributes 202 can represent a variety of information about or associated with an object in an environment (e.g., the object 110 of FIG. 1). In some instances, the attributes 202 can be determined for one or more time instances associated with the object. For example, the object 120 represents the object 110 at time $T_{-2}$, the object 122 represents the object 110 at time $T\_1$, and the object 124 represents the object 110 at time $T_0$. Attributes can be determined for the objects at each of the time instances $T_{-2}$, $T_{-1}$, and $T_0$, for example.

Examples of the attributes 202 include, but are not limited to, a distance between the object and a road, an x- (or first-) distance to a region, a y- (or second-) distance to a region, a distance to a destination, a velocity (magnitude), a velocity (angle), an x-position, a y-position, a region flux, a region control indicator state, a vehicle context (or an object context, generally), an object association, and the like. In at least some examples, the attributes discussed herein may be relative to a relative coordinate system defined at each time step (e.g., associated with the objects 120, 122, 124, respectively), relative to the last determined reference frame, relative to a frame of reference define with respect to the vehicle 108 (e.g., at various time step(s)), with respect to a global coordinate reference frame, and the like.

An example 204 illustrates various attributes associated with the object 124. For example, the example 204 illustrates attributes with respect to the crosswalk region 112 and the destination 114. In some examples, an x-distance to a region can correspond to a distance 206. That is, the distance 206 can represent a distance in a first direction (which may be in a global or local reference frame) between the object 124 and an edge of the crosswalk region 112 nearest to the object 124. In some examples, a y-distance to a region can correspond to a distance 208. That is, the distance 208 can represent a distance in a second direction between the object 124 and an edge of the crosswalk region 112. In at least some examples, a minimum distance between the object 124 and the crosswalk region may be determined and subsequently decomposed into respective x- and y-components as the x- and y-distances, respectively.

As illustrated in the example 204, the object 124 is location on a sidewalk region 210 (or generally, a non-drivable region 210). In some instances, the crosswalk region 112 may provide a path across a road 212 (or generally, a drivable region 212). In some examples, a distance to a road can correspond to a distance 214, which can correspond to a shortest or smallest distance between the object 124 and a portion of the road 212 within the crosswalk region 112.

In some instances, a distance to a destination can correspond to a distance 216. As illustrated, the distance 216 represents a distance between the object 124 and the destination 114.

As introduced above, in some examples, the attribute(s) 202 can be represented in a frame of reference. As discussed herein, the frame of reference may be defined with respect to a location of an object at each time steps, with respect to a last reference frame, a global coordinate system, and the like. In some examples, an origin corresponding to the frame of reference can correspond to a location of the object 124. An example 218 illustrates a frame of reference 220 (also referred to as a reference frame 220). In some examples, a first axis of the frame of reference 220 is defined by a unit vector from a location of the object 124 and in a direction of the destination 114. The first axis is labeled as an x-axis in the example 218. In some examples, a second axis can be perpendicular to the first axis and can lie in a plane comprising the crosswalk. The second axis is labeled as a y-axis in the example 218. In some examples, the first axis can represent a reference line against which distances s can be determined, whereas lateral offsets $e_y$ can be determined relative to the second direction (e.g., the y-axis).

An example 222 illustrates a velocity vector 224 associated with the object 124 and an angle 226 which represents an angle between the velocity vector 224 and a reference line. In some examples, the reference line can correspond to the first axis of the frame of reference 220, although any reference line can be selected or otherwise determined.

As discussed herein, attributes associated with the object 124, 122 and 120 can be represented with respect to the frame of reference 220. That is, at time $T_0$, the x-position and the y-position of the object 124 can be represented as (0, 0) (e.g., the object 124 represent an origin of the frame of reference 220). Further, the x-position and the y-position of the object 122 (at time $T_0$) can be represented at $(-x_1, -y_1)$, and the x-position and the y-position of the object 120 (at time $T_0$) can be represented at $(-x_2, -y_2)$, with respect to the frame of reference 220. In at least some examples, a single coordinate frame may be used, whereas in other examples, a relative coordinate frame may be associated with every point and attributes may be defined relative to each relative coordinate frame.

As mentioned above, the attributes 202 can include a region flux. In some examples, the region flux can represent a number of objects that have passed through the crosswalk region 112 within a period of time. For example, the region flux can correspond to J number of cars (and/or other objects, such as other pedestrians) that have passed through the crosswalk region 112 (or any region) within K number of seconds (e.g., 5 vehicles within the time between $T_{-2}$ and $T_0$). In some examples, the region flux can represent any time period(s). Further, the region flux can include information about a speed, acceleration, velocity, etc. about such vehicles that have traversed through the crosswalk region 112 within the period of time.

Further, the attributes 202 can include a region control indicator. In some examples, the region control indicator can correspond to a state of a traffic signal or indicator controlling pedestrian traffic within the crosswalk region 112. In some examples, the region control indicator can indicate whether a traffic light is present, a state of a traffic light (e.g., green, yellow, red, etc.), and/or a state of a crosswalk indicator (e.g., walk, don't walk, unknown, etc.).

In some examples, the attributes 202 can include a vehicle context, which may indicate whether vehicles or other objects are proximate to the object (e.g., 124) and attributes associated with any such vehicle or object. In some examples, a vehicle context may include, but is not limited to, a velocity, direction, acceleration, bounding box, position (e.g., in the frame of reference 220), distance between the object and the object 124, and the like.

In some examples, the attributes 202 can include an object association. For example, the object association can indicate whether the object 124 is associated with other objects (e.g., whether the object 124 is in a group of pedestrians). In some instances, the object association attribute 202 can include attributes associated with the associated objects.

The attributes 202 may further include, but are not limited to, information associated with an acceleration, yaw, pitch, roll, relative velocity, relative acceleration, whether the object is in the road 212, whether the object is on the sidewalk 210, whether the object is within the crosswalk region 112, whether a destination has changed (e.g., whether the object has turned around in the intersection), an object height, whether the object is on a bicycle, and the like.

The attributes 202 may further include, but are not limited to, pedestrian hand gestures, pedestrian gaze detection, an indication of whether the pedestrian is standing, walking, running, etc., whether other pedestrians are in the crosswalk, a pedestrian crosswalk flux (e.g., a number of pedestrians travelling through the crosswalk (e.g., across the drivable area) over a period of time), a ratio of a first number of pedestrians on a sidewalk (or a non-drivable area) and a second number of pedestrians in the crosswalk region (or a drivable area), variances, confidences, and/or probabilities associated with each attribute, and the like.

Figure 3A:
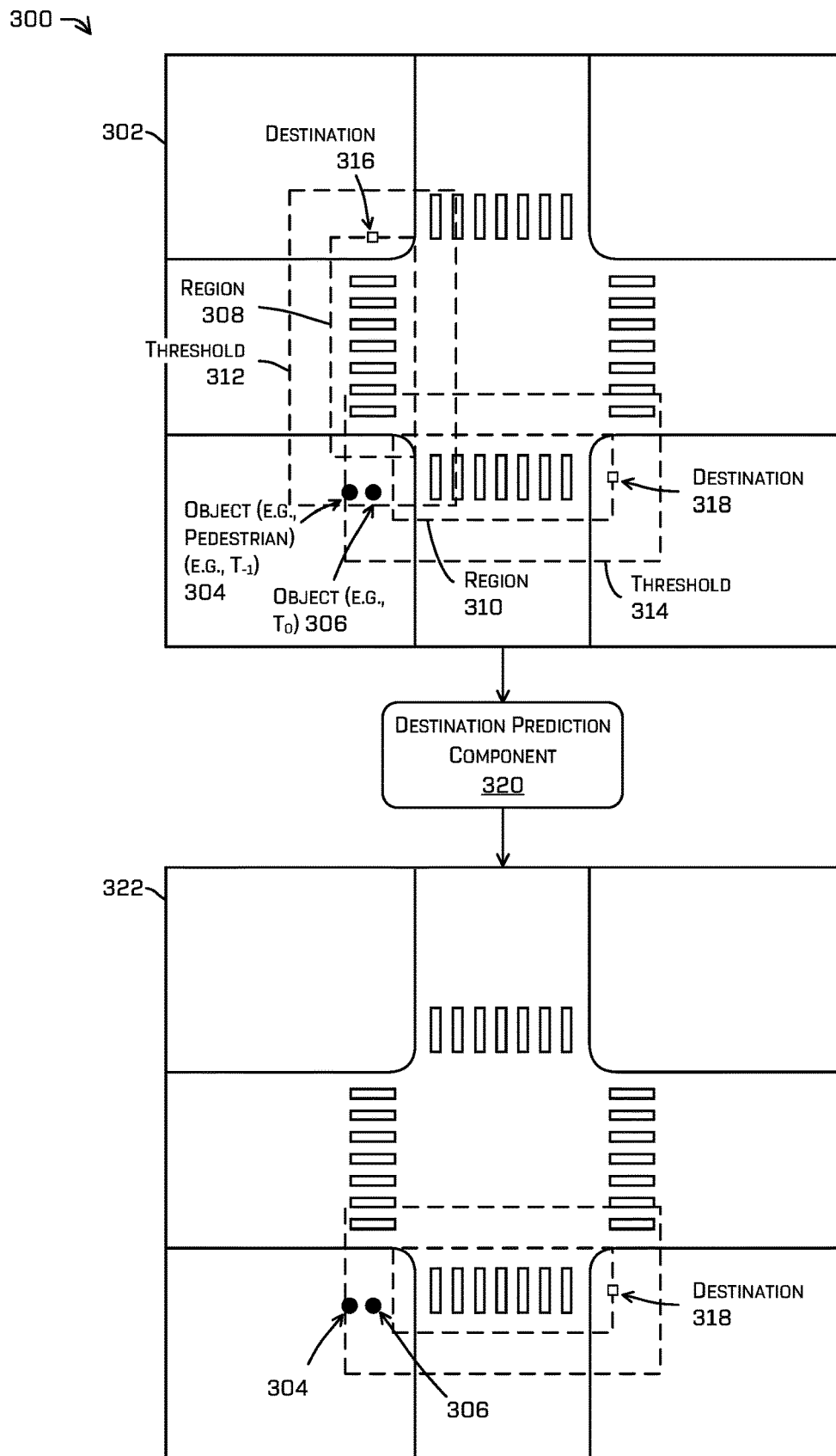
FIG. 3A illustrates an example of determining a destination associated with an object in an environment.
Figure 3B:
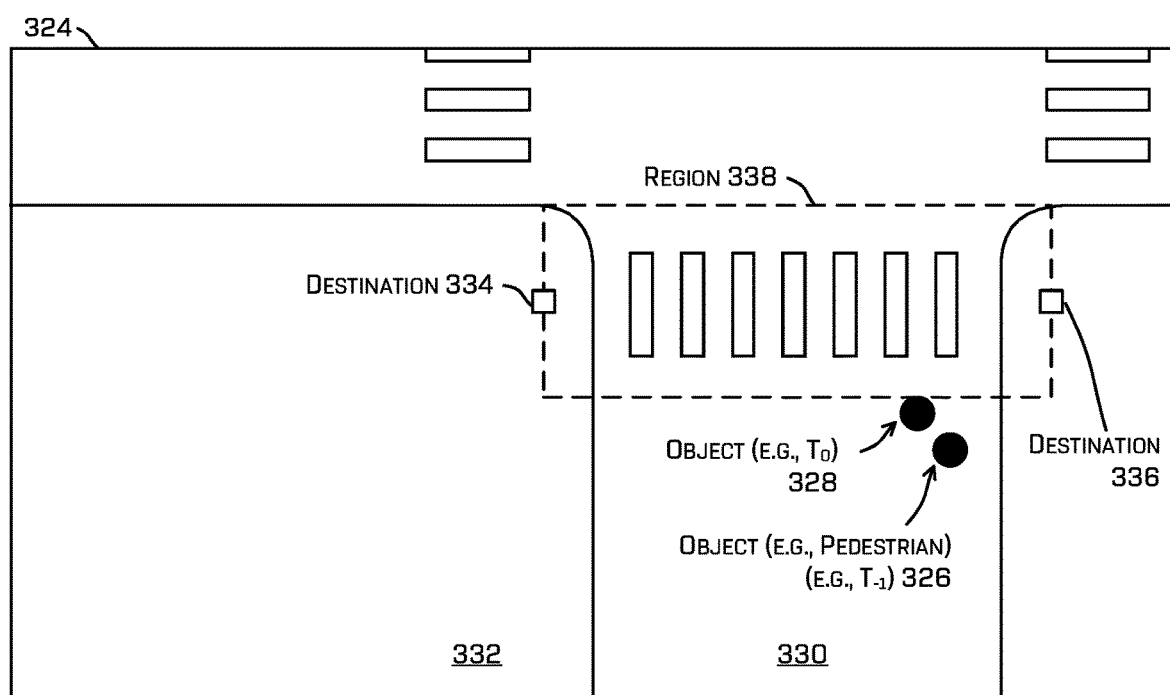
FIG. 3B illustrates another example of determining a destination associated with an object in an environment.

FIGS. 3A and 3B illustrate examples of determining a destination associated with an object in an environment. In general, FIG. 3A illustrates selecting between two crosswalk regions, while FIG. 3B illustrates selecting between two destinations associated with a single crosswalk region.

FIG. 3A illustrates an example 300 of determining a destination associated with an object in an environment. As mentioned above, and in general, FIG. 3A illustrates selecting between two crosswalk regions. An example 302 illustrates an object 304, which may correspond to a pedestrian at time $T_{-1}$, and an object 306, which may correspond to the pedestrian at time $T_0$. For example, a vehicle such as the vehicle 108 can capture sensor data of the environment and can determine that a pedestrian is in the environment.

Further, based at least in part on the objects 304 and 306, a computing system can determine that the objects 304 and/or 306 are proximate to one or more crosswalk regions in the environment. For example, a computing device can access map data which may include map element(s) indicating location(s) and extent(s) (e.g., length and width) of such crosswalk regions. The example 302 illustrates the environment as including a first crosswalk region 308 (also referred to as a region 308) and a second crosswalk region 310 (also referred to as a region 310).

In some instances, the region 308 can be associated with a threshold region 312 (also referred to as a threshold 312) and the region 310 can be associated with a threshold region 314 (also referred to as a threshold 314). As illustrated, the objects 304 and 306 are within the thresholds 312 and 314. Based at least in part on the objects 304 and/or 306 being within the thresholds 312 and 314, a computing device can determine that the objects 304 and/or 306 are associated with the regions 308 and 310, respectively.

In some instances, the threshold 312 can represent any region or area associated with the region 308. As illustrated, the threshold 312 can represent a threshold of 5 meters surrounding the region 308, although any distance or shape of the threshold 312 can be associated with the region 308. Similarly, the threshold 314 can include any distance or shape associated with the region 310.

In some instances, the region 308 can be associated with a destination 316. Further, and in some instances, the region 310 can be associated with a destination 318. In some examples, a location of the destinations 316 and/or 318 are situated across a street from the object 304 and/or 306. That is, a destination associated with a crosswalk region can be selected based at least in part on a location of a pedestrian with respect to the crosswalk region.

The object 304 and/or 306 can be associated with attribute(s) as discussed herein. That is, the techniques can include determining a position, velocity, heading, acceleration, etc., of the objects 304 and 306, respectively.

Further, information represented in the example 302 (e.g., attributes associated with the objects 304 and/or 306, location(s) of the regions 308 and/or 310, locations of the thresholds 312 and/or 314, locations of the destinations 316 and/or 318, and the like) can be input to a destination prediction component 320. In some instances, the destination prediction component 320 can output a score or probability that the object 306 may traverse through the region 308 and/or the region 310. Although the example 302 illustrates object information associated with two time steps (e.g., $T_{-1}$ and $T_0$), object information over any time period can be used in determining a destination.

In some examples, attributes associated with the objects 302 and 306 can be input to the destination prediction component 320 in one or more frames of reference. For example, for evaluating the destination 316, attributes associated with the object 304 and 306 can be input to the destination prediction component 320 using a frame of reference based at least in part on the destination 316. Further, for evaluating the destination 318, attributes associated with the object 304 and 306 can be input to the destination prediction component 320 using a frame of reference based at least in part on the destination 318.

In some examples, as in the case of a jaywalking pedestrian or a pedestrian crossing a road where a crosswalk region is not readily identifiable, a destination associated with a pedestrian can be determined based on a number of factors. For example, a destination can be determined based at least in part on one or more of: a straight line extrapolation of a velocity of a pedestrian, a nearest location of a sidewalk region associated with a pedestrian, a gap between parked vehicles, an open door associated with a vehicle, and the like. In some examples, sensor data can be captured of an environment to identify possible destinations in the environment. Further attributes associated with an object can be represented in a frame of reference based tat least in part on the determined destination, and the attributes can be input to the destination prediction component 320 for evaluation, as discussed herein.

An example 322 illustrates an output of the destination prediction component 320. For example, based at least in part on the attributes of the objects 304 and/or 306, the destination prediction component 320 may predict that the object 304 and/or 306 is heading towards the destination 318.

FIG. 3B illustrates another example 324 of determining a destination associated with an object in an environment. As noted above, FIG. 3B illustrates selecting between two destinations associated with a single crosswalk region.

The example 324 illustrates an object 326, which may correspond to a pedestrian at time $T_{-1}$, and an object 328, which may correspond to the pedestrian at time $T_0$. In some examples, as the objects 326 and 328 are in a road 330 (or a drivable area 330) (in contrast to being located on a sidewalk 332 (or a non-drivable area 332)), a computing device may identify two destinations 334 and 336 associated with a region 338. In some examples, attributes associated with the objects 326 and 328 can be input to the destination prediction component 320 (along with information about the destinations 334 and 336, and the region 338, as well as other information) to determine which of the destinations 334 and 336 are most likely. Although depicted in this FIG. 3B for illustrative purposes as going in and out of a crosswalk, such a crosswalk region is not necessary. As a non-limiting example, such a destination prediction component 320 may generically determine a pedestrian is intending to jaywalk, or otherwise cross in a non-crosswalk area, and output a corresponding destination. In such examples, attributes relative to a region may not be determined (as no region may exist). In some such examples, however, a fixed region perpendicular to a road segment and having a fixed width may be used as a region for determining such parameters.

As noted above, in some examples, the region 338 may be associated with the objects 326 and/or 328 at a time in which the objects 326 and/or 328 are within a threshold distance of the region 338.

Figure 4:
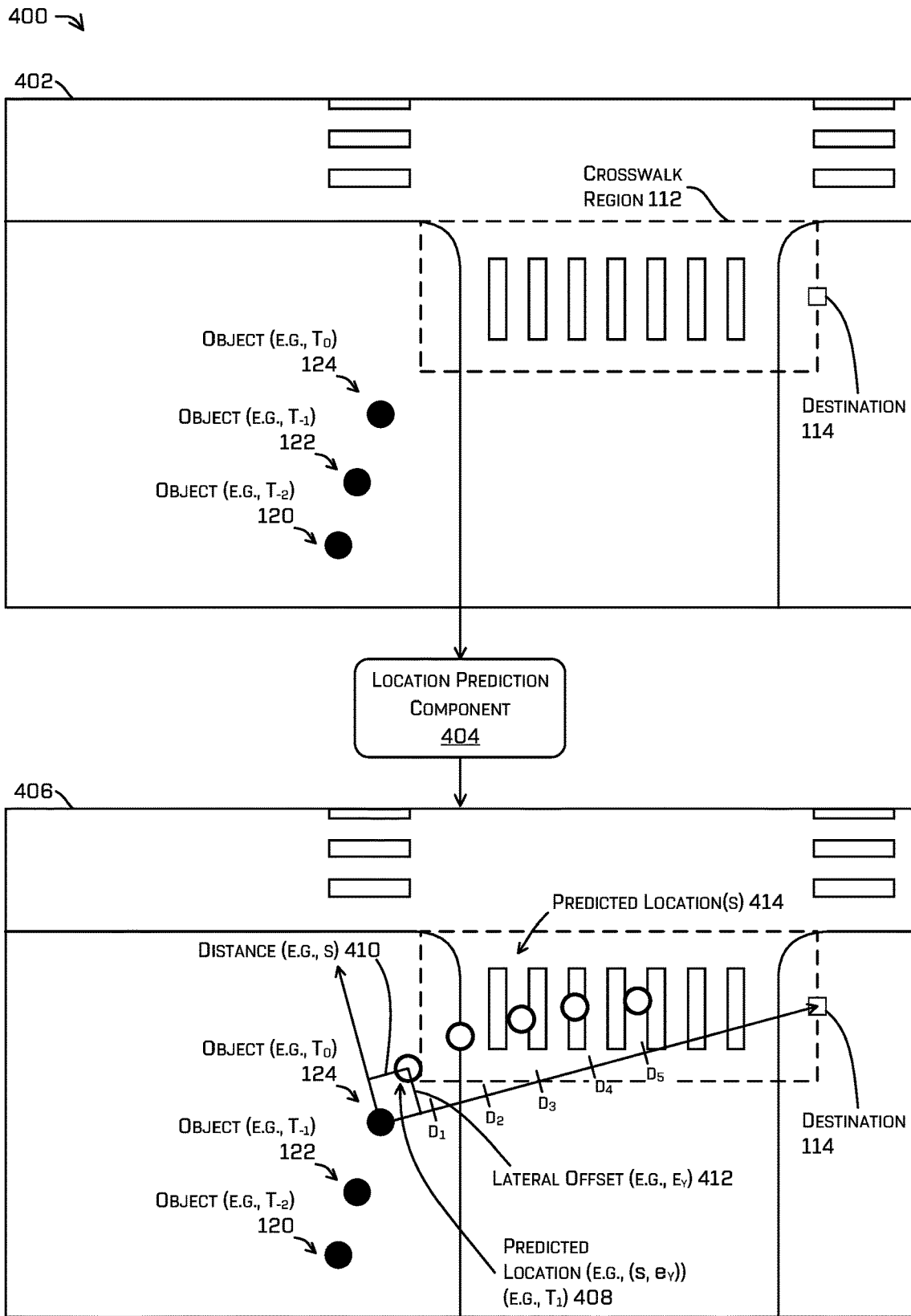
FIG. 4 illustrates an example of determining predicted location(s) for an object based on attributes of the object over time.

FIG. 4 illustrates an example 400 of determining predicted location(s) for an object based on attributes of the object over time.

An example 402 illustrates the object 120 (e.g., a pedestrian at time $T_{-2}$), the object 122 (e.g., the pedestrian at time $T_{-1}$), and the object 124 (e.g., the pedestrian at time $T_0$). As discussed herein, the objects 120, 122, and 124 can be represented in a frame of reference with the object 124 as the origin (and or one or more frames of reference associated with any one or more times). Further, the example 402 illustrates the objects 120, 122, and 124 associated with the crosswalk region 112 and the destination 114.

Data associated with the example 402 can be input to a location prediction component 404 that can output predicted location(s) associated with the objects 120, 122, and/or 124.

An example 406 illustrates predicted location(s) based on the objects 120, 122, and/or 124. For example, the location prediction component 404 can output a predicted location 408, which may represent a location of the object at time $T_1$. In some instances, the predicted location 408 may be represented as a distance (e.g., s) 410 and a lateral offset 412 (e.g., $e_y$) based at least in part on a frame of reference defined by the object 124 (e.g., an origin) and the destination 114.

As illustrated, the location prediction component 404 can output five predicted locations corresponding to times $T_1$, $T_2$, $T_3$, $T_4$, and $T_5$, respectively, although it can be understood that the location prediction component 404 can output any number of predicted locations that are associated with any future time(s). In some examples, such additional predicted locations may be defined by a global coordinate frame, local coordinate frame, relative to a relative reference frame associated with a previous predicted point, and the like.

In some examples, the location prediction component 404 can include functionality to bin output values such as the distance s or the lateral offset $e_y$. That is, the location prediction component 404 can include a binning function to replace values that fall into a bin with a value representative of that bin. For example, a distance, s, that falls within a bin can be replaced with a value that represents a binned value. For example, if a distance s=0.9 meters, and a first bin ranging to 0.0 meters-1.0 meters corresponds to a binned value of 0.5 meters, a binned output for a distance s=0.9 meters would correspond to 0.5 meters. Any number of bins can be used that span any ranges. Of course, in some instances, original values can be output without binning such outputs. In some such examples, an additional value may be associated with the output bin indicating an offset from a central portion of the bin. As a non-limiting example, an output may indicate that the next predicted location falls into a first bin (e.g., between 0 and 1 m) and an associated offset of 0.2 m may be used to indicate that a likely position of the predicted position may be 0.7 m (e.g., 0.5 m+0.2 m).

In general, the predicted location(s) illustrated in the example 406 can be referred to as predicted location(s) 414.

In some examples, the location prediction component 404 can output a variance, covariance, probability, or a certainty associated with the respective predicted location(s) 414 indicative of a certainty that the object 124 will be located at a respective predicted location at a respective time.

Figure 5:
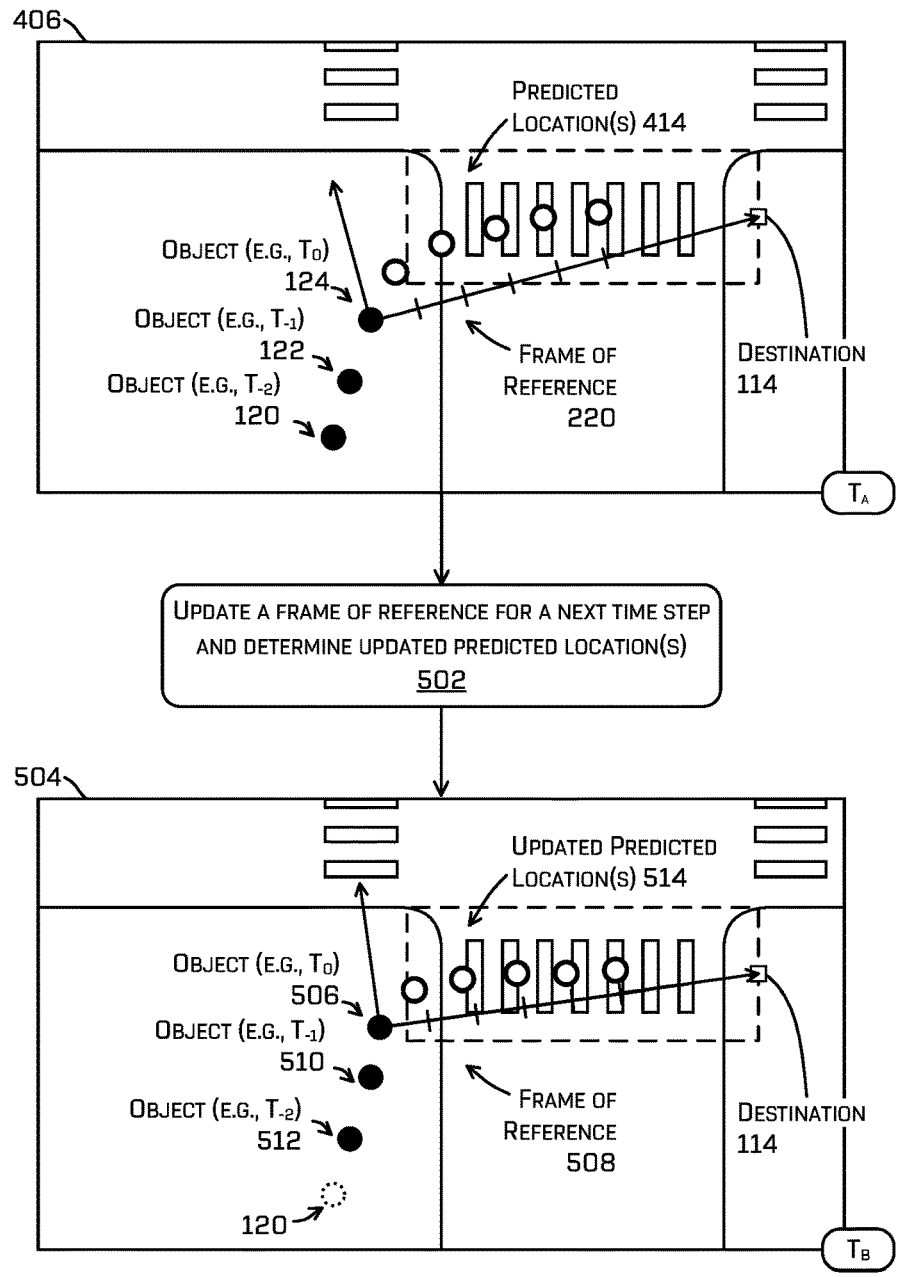
FIG. 5 illustrates an example of updating a frame of reference for use in determining predicted location(s).

FIG. 5 illustrates an example 500 of updating a frame of reference for use in determining predicted location(s).

The example 406 is reproduced in FIG. 5 to represent a time $T_A$, which may correspond to the time $T_0$ represented in the example 406. As illustrated, the objects 120, 122, and 124 are represented in the frame of reference 220, which is defined in part by a location of the object 124 and a location of the destination 114.

In some instances, the example 406 can be updated for a next time step and updated predicted locations can be determined (e.g., in the operation 502).

Such an updated example is illustrated as an example 504, which illustrates an environment corresponding to the example 406 but at a time $T_B$ that occurs after time $T_A$. An object 506 in the example 504 represents a time $T_0$ with respect to a frame of reference 508. Similarly, the example 504 includes an object 510, which represent the object at time $T_{-1}$. An object 512 further represents the object at time $T_{-2}$.

In some examples, the object 510 (e.g., the object at time $T_{-1}$ in the frame of reference 508) can correspond to the object 124 (e.g., the object at time $T_0$ in the frame of reference 220). Similarly, the object 512 (e.g., the object at time $T_{-2}$ in the frame of reference 508) can correspond to the object 122 (e.g., the object at time $T_{-1}$ in the frame of reference 220). For comparison, the example 504 illustrates the object 120, whereby the object 120 (and/or attributes associated with the object 120) may or may not be used when determining updated predicted locations in the example 504.

As can be understood, the frame of reference 508 can be defined by or based at least in part on a location of the object 506 and the destination 114. As such, a relative reference frame can be defined with respect to the destination 114 and most current determined location of the object 124 (e.g., such a coordinate reference frame may change according to changes of the object in the environment).

Accordingly, information associated with the example 504 (which may or may not include information associated with the object 120) can be input to the location prediction component 404 to determine updated predicted location(s) 514. As discussed herein, the updated predicted location(s) 514 may be based at least in part on the frame of reference 508.

In some examples, updated predicted location(s) can be determined at a frequency of 10 Hz, although predicted locations can be determined at any frequency or between any regular or irregular intervals of time.

Figure 6:
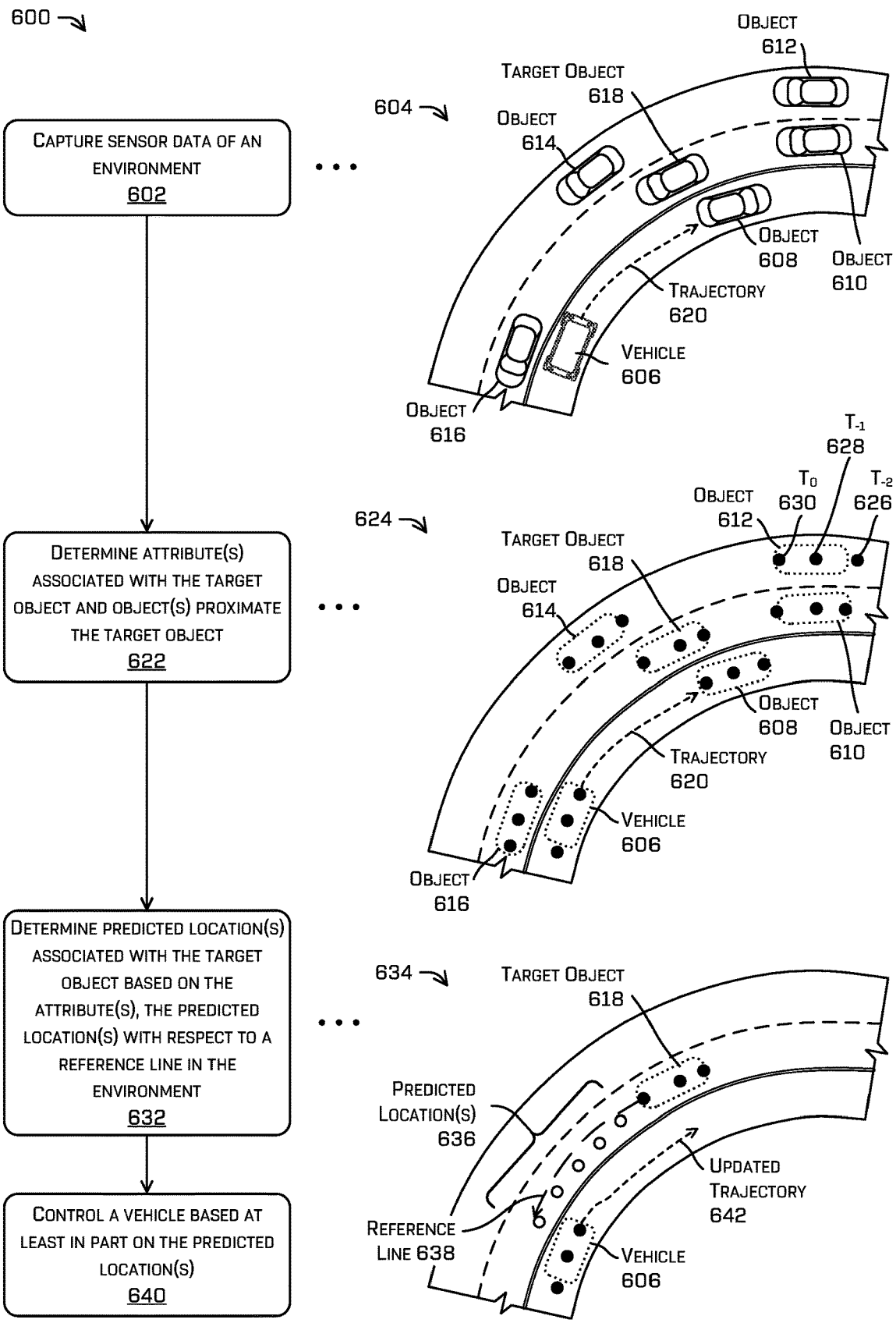
FIG. 6 is a pictorial flow diagram of an example process for capturing sensor data, determining that a first object and second object are in an environment, determining attributes associated with the second object, determining a predicted location based on the attributes and a reference line, and controlling a vehicle based on the predicted location.

FIG. 6 is a pictorial flow diagram of an example process 600 for capturing sensor data, determining that a first object and second object are in an environment, determining attributes associated with the second object, determining a predicted location based on the attributes and a reference line, and controlling a vehicle based on the predicted location.

Although discussed in the context of determining attributes of a first and second object for determining predicted location(s) associated with the first object, in some examples, attributes may not be determined for one or more second objects, and predicted location(s) of a first object can be determined based on the attributes associated with the first object.

At operation 602, the process can include capturing sensor data of an environment. In some examples, the sensor data can be captured by one or more sensors on a vehicle (autonomous or otherwise). For example, the sensor data can include data captured by a lidar sensor, an image sensor, a radar sensor, a time of flight sensor, a sonar sensor, and the like. In some examples, the operation 602 can include determining a classification of an object (e.g., to determine that an object is a vehicle in an environment).

An example 604 illustrates a vehicle 606, which may capture the sensor data in the operation 602. The environment may further include objects 608, 610, 612, 614, 616, and 618. In some examples, the object 618 can be referred to as a target object 618, as the target object 618 may be the subject to (e.g., the target of) such prediction operations, as discussed herein.

In some examples, the vehicle 606 may traverse through the environment via a trajectory 620. As can be understood in the context of FIG. 6, the object 608 can be travelling in a same direction as the vehicle 606 (e.g., in the same lane as the vehicle 606), while in some examples, the objects 610-618 and the target object 618 can be travelling in an opposite direction (e.g., the target object 618 can represent oncoming traffic with respect to the vehicle 606). Of course, the process 600 can be used in any environment and is not limited to the particular objects and/or geometry illustrated in FIG. 6.

At operation 622, the process can include determining attribute(s) associated with the target object and object(s) proximate the target object. An example 624 illustrates the vehicle 606, the objects 606-616, and the target object 618. In some examples, the operation 622 may include determining attribute(s) associated with the target object without determining attributes of other objects. For example, such other objects may not be present in an environment or such attributes of other objects may not be needed, desired, or required for determining predicted location(s) of the target object 618, according to implementations of the techniques discussed herein.

For the purpose of illustration, the outline of the object 612 is illustrated with a dotted line, while elements 626, 628, and 630 corresponding to the object 612 are represented as points. In some examples, the element 626 represents a location associated with the object 612 at a time $T_{-2}$. In some examples, the element 628 represents a location associated with the object 612 at a time $T_{-1}$. And in some examples, the element 630 represents a location associated with the object 612 at time $T_0$.

As further illustrated, the vehicle 606, the objects 608-616, and the target object 618 are associated with elements, although such elements are not labeled in FIG. 6. It can be understood in the context of this disclosure that such elements represent locations associated with the vehicle and/or objects at respective times (e.g., times $T_{-2}$, $T_{-1}$, and $T_0$) and/or can represent attributes associated with the objects at the respective times.

In some examples, attributes determined in the operation 622 can represent information about each respective object. For example, such attributes can include, but are not limited to, a location of an object (e.g., a global location and/or a relative location with respect to any frame of reference), a velocity, an acceleration, a bounding box, a lighting state, lane attribute(s), an offset from a reference line or predicted path, and the like. Additional details of such attributes are discussed in connection with FIG. 7, as well as throughout this disclosure.

In some examples, the operation 622 can include determining or identifying objects based at least in part on a proximity of the object to the target object. For example, the operation 622 can include determining the nearest N number of objects proximate the target object 618, where N is an integer. Additionally or in the alternative, the operation 622 may include identifying or selecting objects based on the object being within a threshold distance of the target object 618. In at least some examples, such selection may exclude certain objects based on one or more characteristics, for example, but not limited to, object classification (e.g., only consider vehicles), direction of motion (e.g., only consider objects moving in the same direction), location relative to a map (e.g., only consider vehicles in one or more lane(s) of a road), and the like.

At operation 632, the process can include determining predicted location(s) associated with the target object based at least in part on the attribute(s), the predicted location(s) with respect to a reference line (which, in some examples, may comprise a center line of a lane associated with the object) in the environment. An example 634 illustrates predicted location(s) 636 associated with the target object 618 in the environment. In some examples, the predicted location(s) 636 can be defined by and/or based at least in part on a reference line 638. That is, the predicted location(s) 636 can be expressed by a distance s along the reference line 638 and by a lateral offset $e_y$ from the reference line 638.

In some examples, the reference line 638 can be based at least in part on map data of the environment. Further, in some examples, the reference line 638 can correspond to a centerline of a lane of a road or other drivable area.

In some examples, the operation 632 can include receiving a reference line associated with the target object 618, such as from a reference line prediction component. In some examples, the reference line prediction component can comprise a machine learned model trained to output a most likely reference line based at least in part on map data, attributes of object(s) in the environment, and the like. In some instances, the reference line prediction component can be integrated into the other machine learned models discussed herein, and in some instances, the reference line prediction component can be a separate component.

In some examples, the operation 632 can include selecting the reference line 638 from a plurality of candidate reference lines. In some examples, the reference line 638 can be selected based at least in part on a similarity score representing a similarity of the predicted location(s) 636 with respect to the reference line 638. In some examples, predicted location(s) 636 may relative to a predicted path and/or trajectory, previously predicted waypoints, and the like. Additional examples of the predicted location(s), the reference line(s), and similarity score(s) are discussed in connection with FIG. 8, as well as throughout this disclosure.

At operation 640, the process can include controlling a vehicle based at least in part on the predicted location(s). In some examples, the operation 640 can include generating a trajectory or an updated trajectory 642 for the vehicle 608 to follow (e.g., to bias the vehicle 606 away from the predicted location(s) 636 associated with the vehicle 618, in the event the target object 618 may traverse closely to an expect path of the vehicle 608).

Figure 7:
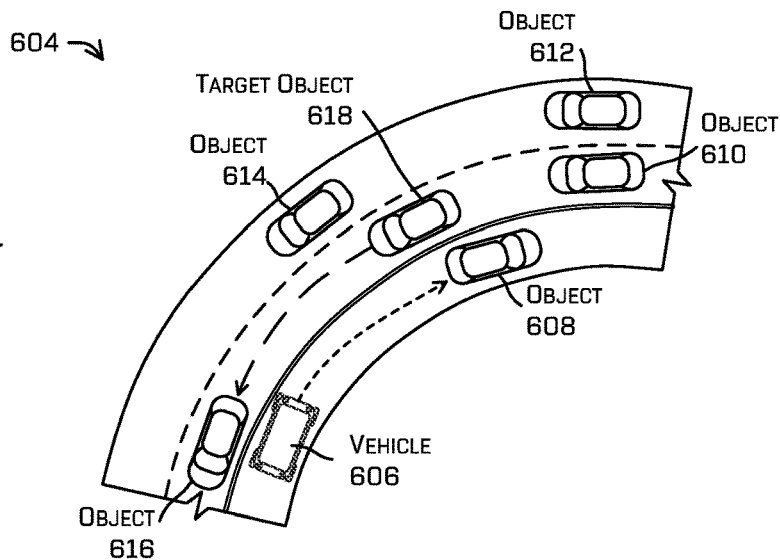
FIG. 7 illustrates examples of attributes of an object.
Figure 7:
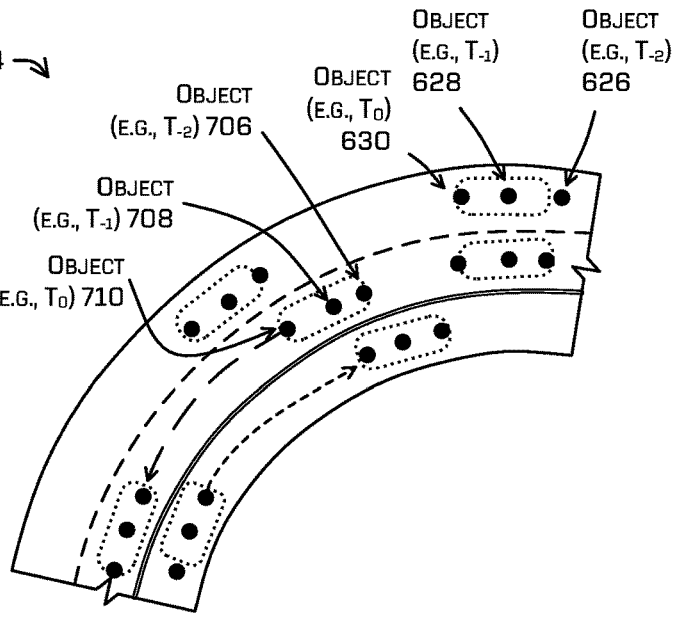

FIG. 7 illustrates examples 700 of attributes of an object. In some instances, attributes 702 can represent a variety of information about or associated with an object in an environment (e.g., the object 612 and the target object 618 of FIG. 6, as represented in the example 604 reproduced in FIG. 7).

In some instances, the attributes 702 can be determined for one or more time instances of the object. An example 704 illustrates the object 612 at time instances $T_{-2}$, $T_{-1}$, and $T_0$. For example, the element 626 represents the object 612 at time $T_{-2}$, the element 628 represents the object 612 at time $T_{-1}$, and the element 630 represents the object 612 at time $T_0$.

Further, attributes can be determined for any type and/or number of objects in the example 704, and is not limited to the object 612. For example, attributes can be determined for an element 706 (e.g., representing the target object 618 at time $T_{-2}$), an element 708 (e.g., representing the target object 618 at time $T_{-1}$), and an element 710 (e.g., representing the target object 618 at time $T_0$). Further, attributes can be determined for any number of time instances, and are not limited to $T_{-2}$, $T_{-1}$, and $T_0$.

Examples of the attributes 702 include, but are not limited to, a velocity of an object, an acceleration of the object, an x-position of the object (e.g., a global position, local position, and/or a position with respect to any other frame of reference), a y-position of the object (e.g., a local position, a global position and/or a position with respect to any other frame of reference), a bounding box associated with the object (e.g., extents (length, width, and/or height), yaw, pitch, roll, etc.), lighting states (e.g., brake light(s), blinker light(s), hazard light(s), headlight(s), reverse light(s), etc.), a wheel orientation of the object, map elements (e.g., a distance between the object and a stop light, stop sign, speed bump, intersection, yield sign, and the like), a classification of the object (e.g., vehicle, car, truck, bicycle, motorcycle, pedestrian, animal, etc.), an object characteristic (e.g., whether the object is changing lanes, whether the object is a double-parked vehicle, etc.), proximity with one or more objects (in any coordinate frame), lane types (e.g., direction of a lane, parking lane), road markings (e.g., indicative of whether passing or lane changes are permitted, etc.), and the like.

In some examples, attributes of objects can be determined with respect to a local frame of reference, global coordinates, and the like. For example, a frame of reference can be determined with an origin corresponding to a location of the target object 618 at time $T_0$ (e.g., the object 710).

Figure 8:
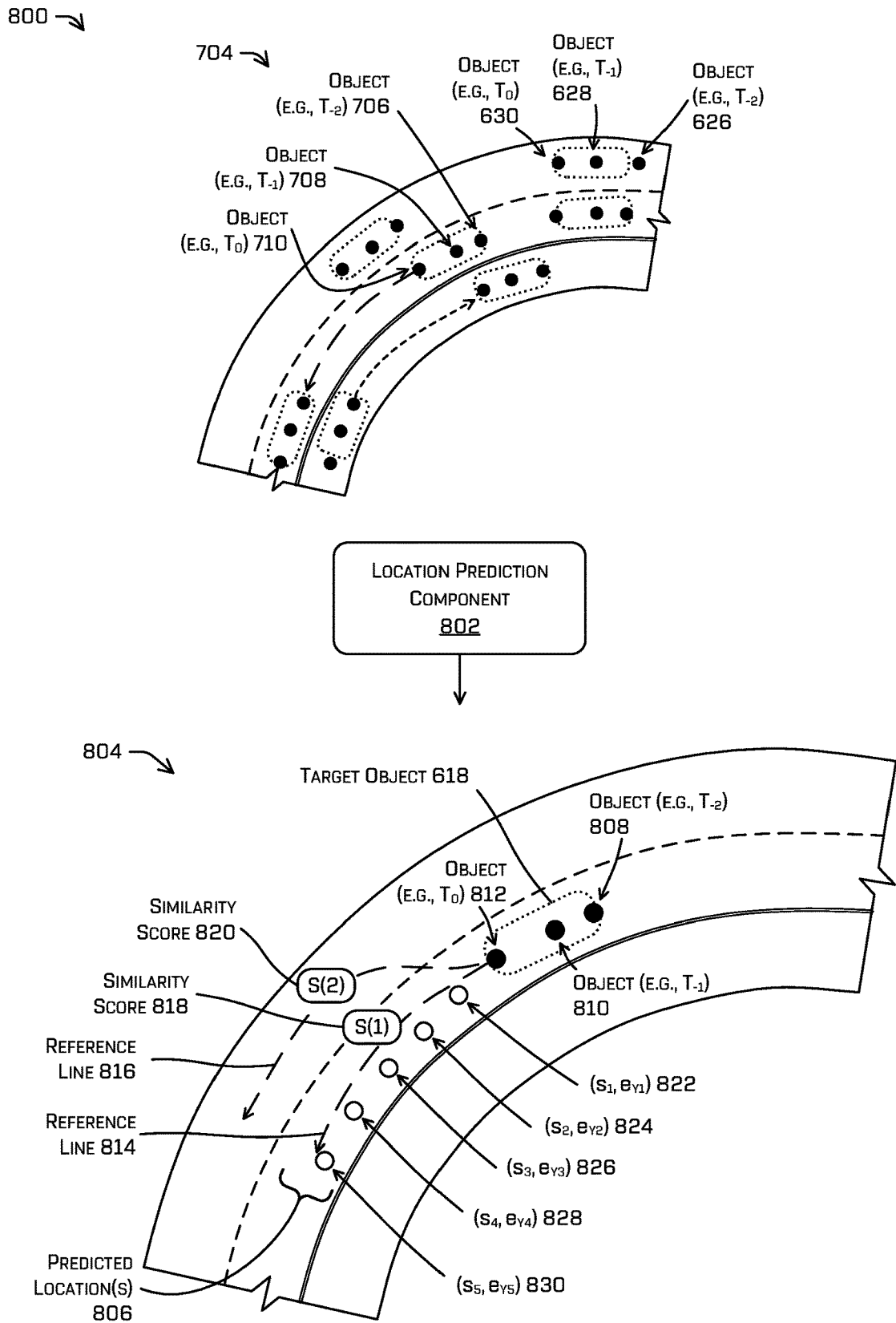
FIG. 8 illustrates an example of determining predicted location(s) for a first object based on attributes of a second object over time.

FIG. 8 illustrates an example 800 of determining predicted location(s) for a first object based on attributes of a second object over time.

As illustrated, information associated with the example 704 of FIG. 7 can be input to a location prediction component 802, which in turn can output predicted location(s) associated with a target object. For example, attribute information associated with the vehicle 606, the objects 608-616, and/or the target object 618 at various times (e.g., $T_{-2}$, $T_{-1}$, and $T_0$) can be input to the location prediction component 802.

An example 804 illustrates predicted location(s) 806 associated with the target object 618. That is, the location prediction component 802 can receive attribute information associated with objects that are proximate the target object 618, as well as attribute information associated with the target object 618, and can output predicted location(s) 806 representing the target object 618 in the future.

An object 808 illustrates the target object 618 at time $T_{-2}$. An object 810 represents the target object 618 at time $T_{-1}$. And an object 812 represents the target object at time $T_0$.

The location prediction component 802 can determine predicted location(s) 806 based on the attribute information discussed herein. In some examples, the predicted location(s) can initially be represented in a global coordinate system, in a frame of reference with the target object as an origin, and the like. Further, the predicted locations can be represented with respect to a reference line in the environment.

In some examples, the environment may represent a plurality of reference lines such as the reference line 814 and the reference line 816. As depicted in FIG. 8 for illustrative purposes, the reference line 816 may, for example, correspond to a lane change of the target object. In some examples, the reference line 814 may represent a centerline of a first road segment and the reference line 816 may represent a centerline of a second road segment (and/or a transition therebetween). In some examples, such as a single lane road, the environment may represent a single reference line. However, in some examples, an environment may represent a plurality of reference lines.

In some examples, the location prediction component 802 can receive an indication of a most likely reference line (e.g., 814) as an input. In some examples, the location prediction component 802 can determine a likely reference line based at least in part on one or more attributes of the target object 618, of other objects, and/or the environment, as described herein.

In some examples, the location prediction component 802 can determine a similarity score 818 that represents a similarity between the predicted location(s) 806 and the reference line 814. Further, the location prediction component 802 can determine a similarity score 820 that represents a similarity between the predicted location(s) 806 and the reference line 816. In some examples, a similarity score can be based at least in part on an individual or cumulative lateral offset between the predicted location(s) and a respective reference line, although other metrics can be used to determine a similarity score.

In some examples, the location prediction component 802 can determine that the similarity score 818 is lower than the similarity score 820, and accordingly, can select the reference line 814 as the basis for defining, in part, the predicted location(s) 806. In other examples, however, each potential reference line may be input into the location prediction component 802 along with the previously computed attributes such that the location prediction component 802 may select the appropriate reference line and/or trajectory to use as a basis based on machine learned parameters.

The predicted location(s) 806 can include predicted locations 822, 824, 826, 828, and/or 830. In some examples, the predicted location 822 can represent a first distance s and a first lateral offset (e.g., $(s_1, e_{y1})$) with respect to the reference line 814. The predicted location 824 can represent a second distance s and a second lateral offset (e.g., $(s_2, e_{y2})$) with respect to the reference line 814. The predicted location 826 can represent a third distance s and a third lateral offset (e.g., $(s_3, e_{y3})$) with respect to the reference line 814. The predicted location 828 can represent a fourth distance s and a fourth lateral offset (e.g., $(s_4, e_{y4})$) with respect to the reference line 814. And the predicted location 830 can represent a fifth distance s and a fifth lateral offset (e.g., $(s_5, e_{y5})$) with respect to the reference line 814. Of course, the location prediction component 802 can determine fewer or more predicted location(s), as discussed herein.

Figure 9:
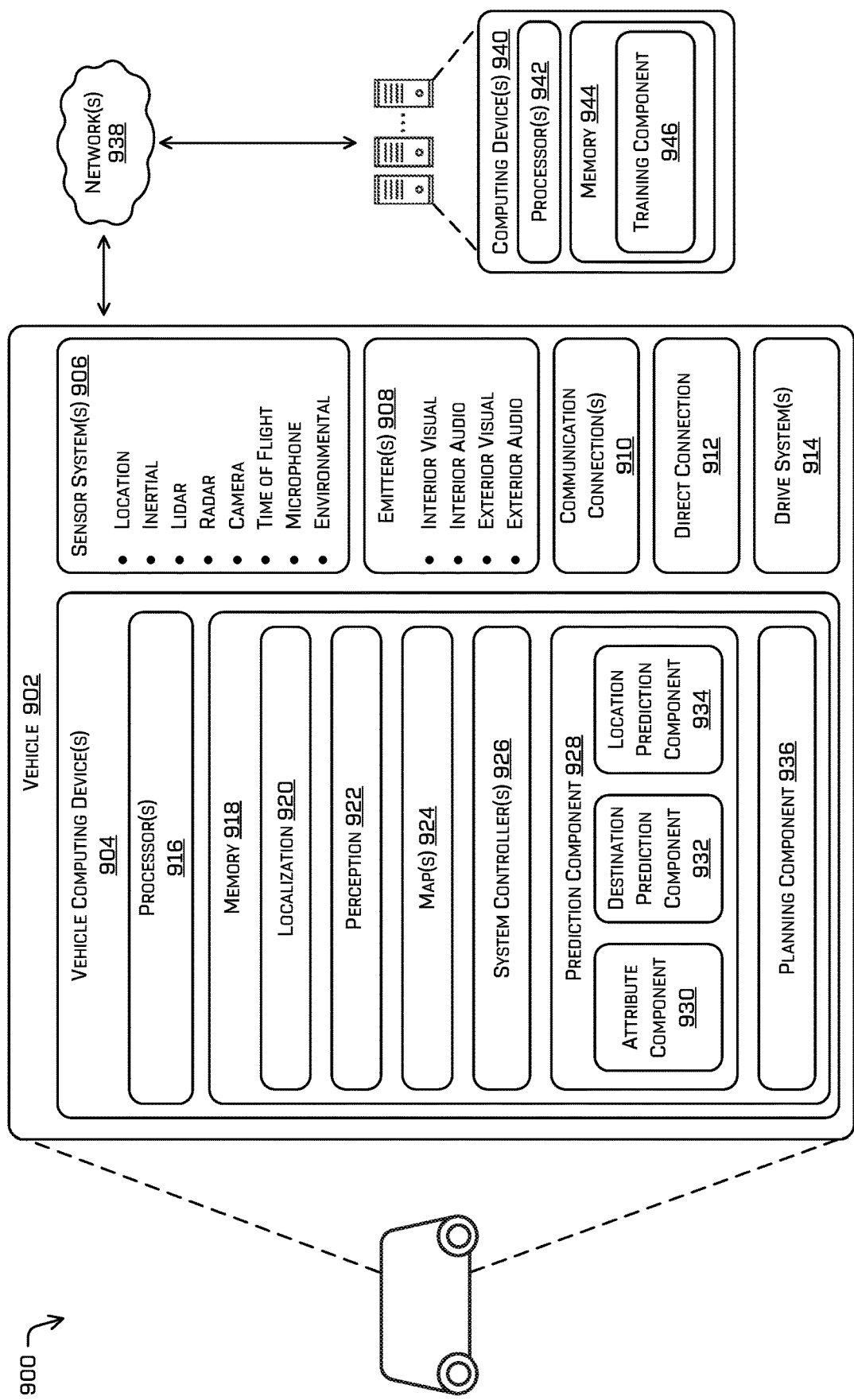
FIG. 9 depicts a block diagram of an example system for implementing the techniques described herein.

FIG. 9 depicts a block diagram of an example system 900 for implementing the techniques described herein. In at least one example, the system 900 can include a vehicle 902, which can correspond to the vehicle 108 of FIG. 1 and the vehicle 606 of FIG. 6.

The example vehicle 902 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 902 can be configured to control all functions from start to completion of the trip, including all parking functions, it may not include a driver and/or controls for driving the vehicle 902, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 902 can include vehicle computing device(s) 904, one or more sensor systems 906, one or more emitters 908, one or more communication connections 910, at least one direct connection 912, and one or more drive systems 914.

The vehicle computing device(s) 904 can include one or more processors 916 and memory 918 communicatively coupled with the one or more processors 916. In the illustrated example, the vehicle 902 is an autonomous vehicle; however, the vehicle 902 could be any other type of vehicle or robotic platform. In the illustrated example, the memory 918 of the vehicle computing device(s) 904 stores a localization component 920, a perception component 922, one or more maps 924, one or more system controllers 926, a prediction component 928 comprising an attribute component 930, a destination prediction component 932, and a location prediction component 934, and a planning component 936. Though depicted in FIG. 9 as residing in the memory 918 for illustrative purposes, it is contemplated that the localization component 920, the perception component 922, the one or more maps 924, the one or more system controllers 926, the prediction component 928, the attribute component 930, the destination prediction component 932, the location prediction component 934, and a planning component 936 can additionally, or alternatively, be accessible to the vehicle 902 (e.g., stored on, or otherwise accessible by, memory remote from the vehicle 902).

In at least one example, the localization component 920 can include functionality to receive data from the sensor system(s) 906 to determine a position and/or orientation of the vehicle 902 (e.g., one or more of an x-, y-, z-position, roll, pitch, or yaw). For example, the localization component 920 can include and/or request/receive a map of an environment and can continuously determine a location and/or orientation of the autonomous vehicle within the map. In some instances, the localization component 920 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 920 can provide data to various components of the vehicle 902 to determine an initial position of an autonomous vehicle for generating a trajectory and/or for determining that an object is proximate to one or more crosswalk regions and/or for identifying candidate reference lines, as discussed herein.

In some instances, and in general, the perception component 922 can include functionality to perform object detection, segmentation, and/or classification. In some examples, the perception component 922 can provide processed sensor data that indicates a presence of an entity that is proximate to the vehicle 902 and/or a classification of the entity as an entity type (e.g., car, pedestrian, cyclist, animal, building, tree, road surface, curb, sidewalk, stoplight, stop sign, unknown, etc.). In additional or alternative examples, the perception component 922 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 918 can further include one or more maps 924 that can be used by the vehicle 902 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 924 can include at least one map (e.g., images and/or a mesh).

In some examples, the vehicle 902 can be controlled based at least in part on the maps 924. That is, the maps 924 can be used in connection with the localization component 920, the perception component 922, the prediction component 928, and/or the planning component 936 to determine a location of the vehicle 902, identify objects in an environment, and/or generate routes and/or trajectories to navigate within an environment.

In some examples, the one or more maps 924 can be stored on a remote computing device(s) (such as the computing device(s) 940) accessible via network(s) 938. In some examples, multiple maps 924 can be stored based on, for example, a characteristic (e.g., type of entity, time of day, day of week, season of the year, etc.). Storing multiple maps 924 can have similar memory requirements, but can increase the speed at which data in a map can be accessed.

In at least one example, the vehicle computing device(s) 904 can include one or more system controllers 926, which can be configured to control steering, propulsion, braking, safety, emitters, communication, and other systems of the vehicle 902. These system controller(s) 926 can communicate with and/or control corresponding systems of the drive system(s) 914 and/or other components of the vehicle 902.

In general, the prediction component 928 can include functionality to generate predicted information associated with objects in an environment. In some examples, the prediction component 928 can be implemented to predict locations of a pedestrian proximate to a crosswalk region (or otherwise a region or location associated with a pedestrian crossing a road) in an environment as they traverse or prepare to traverse through the crosswalk region. In some examples, the techniques discussed herein can be implemented to predict locations of objects (e.g., a vehicle, a pedestrian, and the like) as the vehicle traverses an environment. In some examples, the prediction component 928 can generate one or more predicted trajectories for such target objects based on attributes of the target object and/or other objects proximate the target object.

The attribute component 930 can include functionality to determine attribute information associated with objects in an environment. In some examples, the attribute component 930 can receive data from the perception component 922 to determine attribute information of objects over time.

In some examples, attributes of an object (e.g., a pedestrian) can be determined based on sensor data captured over time, and can include, but are not limited to, one or more of a position of the pedestrian at a time (e.g., wherein the position can be represented in the frame of reference discussed above), a velocity of the pedestrian at the time (e.g., a magnitude and/or angle with respect to the first axis (or other reference line)), an acceleration of the pedestrian at the time, an indication of whether the pedestrian is in a drivable area (e.g., whether the pedestrian is on a sidewalk or a road), an indication of whether the pedestrian is in a crosswalk region, an indication of whether the pedestrian is jaywalking, a region control indicator state (e.g., whether the crosswalk is controlled by a traffic signal and/or a state of the traffic signal), a vehicle context (e.g., a presence of a vehicle in the environment and attribute(s) associated with the vehicle), a flux through the crosswalk region over a period of time (e.g., a number of objects (e.g., vehicles and/or pedestrians) through the crosswalk region over a period of time), an object association (e.g., whether the pedestrian is travelling in a group of pedestrians), a distance to the crosswalk in a first direction (e.g., a global x-direction), a distance to a crosswalk in a second direction (e.g., a global y-direction), a distance to the road in the crosswalk region (e.g., a shortest distance to the road within the crosswalk region), and the like.

In some examples, attributes can be determined for a target object (e.g., a vehicle) and/or other object(s) (e.g., other vehicles) that are proximate the target object. For example, attributes can include, but are not limited to, one or more of a velocity of the object at a time, an acceleration of the object at the time, a position of the object at the time (e.g., in global or local coordinates), a bounding box associated with the object at the time (e.g., representing extent(s) of the object, roll, pitch, and/or yaw), a lighting state associated with the object at the first time (e.g., headlight(s), braking light(s), hazard light(s), turn indicator light(s), reverse light(s), etc.), a distance between the object and a map element at the time (e.g., a distance to a stop line, traffic line, speed bump, yield line, intersection, driveway, etc.), a distance between the object and other objects, a classification of the object (e.g., car, vehicle, animal, truck, bicycle, etc.), a characteristic associated with the object (e.g., whether the object is changing lanes, is a double parked vehicle, etc.), and the like.

In some examples, any combination of attributes for an object can be determined, as discussed herein.

Attributes can be determined over time (e.g., at times $T_{-M}, \ldots, T_{-2}, T_{-1}, T_0$ (where M is an integer) and the various times represent any time up to a most recent time) and input to the destination prediction component 932 and/or the location prediction component 934 to determine predicted information associated with such objects.

The destination prediction component 932 can include functionality to determine a destination for an object in an environment, as discussed herein. In the context of a pedestrian, the destination prediction component 932 can determine which crosswalk region(s) may be applicable to a pedestrian based on the pedestrian being within a threshold distance of the crosswalk region(s), as discussed herein. In at least some examples, such a destination prediction component 932 may determine a point on an opposing sidewalk, regardless of an existence of a crosswalk. Further, attributes for an object associated with any period of time can be input to the destination prediction component 932 to determine a score, probability, and/or likelihood that a pedestrian is heading towards or may be associated with a crosswalk region.

In some examples, the destination prediction component 932 is a machine learned model such as a neural network, a fully connected neural network, a convolutional neural network, a recurrent neural network, and the like.

In some examples, the destination prediction component 932 can be trained by reviewing data logs to determine events where a pedestrian has crossed a crosswalk. Such events can be identified and attributes can be determined for the object (e.g., the pedestrian) and the environment, and data representing the events can be identified as training data. The training data can be input to a machine learning model where a known result (e.g., a ground truth, such as the known "future" attributes) can be used to adjust weights and/or parameters of the machine learning model to minimize an error.

The location prediction component 934 can include functionality to generate or otherwise determine predicted location(s) associated with objects in an environment. For example, as discussed herein, attribute information can be determined for one or more objects in an environment, which may include a target object and/or other object proximate to the target object. In some examples, attributes associated with the vehicle 902 can be used to determine predicted location(s) associated with object(s) in an environment.

The location prediction component 934 can further include functionality to represent attribute information in various frame(s) of reference, as discussed herein. In some examples, the location prediction component 934 can use a location of an object at time $T_0$ as an origin for a frame of reference, which can be updated for each time instance.

In some examples, the location prediction component 934 can include functionality to identify candidate reference lines in an environment (e.g., based on map data) and can select a reference line (e.g., based on a similarity score) to determine the predicted location(s) with respect to the reference line.

In some examples, the location prediction component 934 is a machine learned model such as a neural network, a fully connected neural network, a convolutional neural network, a recurrent neural network, and the like, or any combination thereof.

For example, the location prediction component 934 can be trained by reviewing data logs and determining attribute information. Training data representing relevant events (e.g., vehicles driving a threshold distance away from a reference line, pedestrians traversing crosswalks, pedestrians jaywalking, and the like) can be input to a machine learning model where a known result (e.g., a ground truth, such as the known "future" attributes/locations) can be used to adjust weights and/or parameters of the machine learning model to minimize an error In general, the planning component 936 can determine a path for the vehicle 902 to follow to traverse the environment. For example, the planning component 936 can determine various routes and trajectories and various levels of detail. For example, the planning component 936 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 936 can generate an instruction for guiding the autonomous vehicle along at least a portion of the route from the first location to the second location. In at least one example, the planning component 936 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 902 to navigate.

In some instances, the planning component 936 can generate one or more trajectories for the vehicle 902 based at least in part on predicted location(s) associated with object(s) in an environment. In some examples, the planning component 936 can use temporal logic, such as linear temporal logic and/or signal temporal logic, to evaluate one or more trajectories of the vehicle 902.

As can be understood, the components discussed herein (e.g., the localization component 920, the perception component 922, the one or more maps 924, the one or more system controllers 926, the prediction component 928, the attribute component 930, the destination prediction component 932, the location prediction component 934, and the planning component 936) are described as divided for illustrative purposes. However, the operations performed by the various components can be combined or performed in any other component. Further, any of the components discussed as being implemented in software can be implemented in hardware, and vice versa. Further, any functionality implemented in the vehicle 902 can be implemented in the computing device(s) 940, or another component (and vice versa).

In at least one example, the sensor system(s) 906 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 906 can include multiple instances of each of these or other types of sensors. For instance, the time of flight sensors can include individual time of flight sensors located at the corners, front, back, sides, and/or top of the vehicle 902. As another example, the camera sensors can include multiple cameras disposed at various locations about the exterior and/or interior of the vehicle 902. The sensor system(s) 906 can provide input to the vehicle computing device(s) 904. Additionally or alternatively, the sensor system(s) 906 can send sensor data, via the one or more networks 938, to the one or more computing device(s) 940 at a particular frequency, after a lapse of a predetermined period of time, in near real-time, etc.

The vehicle 902 can also include one or more emitters 908 for emitting light and/or sound, as described above. The emitters 908 in this example include interior audio and visual emitters to communicate with passengers of the vehicle 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 902 can also include one or more communication connection(s) 910 that enable communication between the vehicle 902 and one or more other local or remote computing device(s). For instance, the communication connection(s) 910 can facilitate communication with other local computing device(s) on the vehicle 902 and/or the drive system(s) 914. Also, the communication connection(s) 910 can allow the vehicle to communicate with other nearby computing device(s) (e.g., other nearby vehicles, traffic signals, etc.). The communications connection(s) 910 also enable the vehicle 902 to communicate with a remote teleoperations computing device or other remote services.

The communications connection(s) 910 can include physical and/or logical interfaces for connecting the vehicle computing device(s) 904 to another computing device or a network, such as network(s) 938. For example, the communications connection(s) 910 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 902 can include one or more drive systems 914. In some examples, the vehicle 902 can have a single drive system 914. In at least one example, if the vehicle 902 has multiple drive systems 914, individual drive systems 914 can be positioned on opposite ends of the vehicle 902 (e.g., the front and the rear, etc.). In at least one example, the drive system(s) 914 can include one or more sensor systems to detect conditions of the drive system(s) 914 and/or the surroundings of the vehicle 902. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 914. In some cases, the sensor system(s) on the drive system(s) 914 can overlap or supplement corresponding systems of the vehicle 902 (e.g., sensor system(s) 906).

The drive system(s) 914 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 914. Furthermore, the drive system(s) 914 also include one or more communication connection(s) that enable communication by the respective drive system with one or more other local or remote computing device(s).

In at least one example, the direct connection 912 can provide a physical interface to couple the one or more drive system(s) 914 with the body of the vehicle 902. For example, the direct connection 912 can allow the transfer of energy, fluids, air, data, etc. between the drive system(s) 914 and the vehicle. In some instances, the direct connection 912 can further releasably secure the drive system(s) 914 to the body of the vehicle 902.

In at least one example, the localization component 920, the perception component 922, the one or more maps 924, the one or more system controllers 926, the prediction component 928, the attribute component 930, the destination prediction component 932, the location prediction component 934, and the planning component 936 can process sensor data, as described above, and can send their respective outputs, over the one or more network(s) 938, to one or more computing device(s) 940. In at least one example, the localization component 920, the one or more maps 924, the one or more system controllers 926, the prediction component 928, the attribute component 930, the destination prediction component 932, the location prediction component 934, and the planning component 936 can send their respective outputs to the one or more computing device(s) 940 at a particular frequency, after a lapse of a predetermined period of time, in near real-time, etc.

In some examples, the vehicle 902 can send sensor data to one or more computing device(s) 940 via the network(s) 938. In some examples, the vehicle 902 can send raw sensor data to the computing device(s) 940. In other examples, the vehicle 902 can send processed sensor data and/or representations of sensor data to the computing device(s) 940. In some examples, the vehicle 902 can send sensor data to the computing device(s) 940 at a particular frequency, after a lapse of a predetermined period of time, in near real-time, etc. In some cases, the vehicle 902 can send sensor data (raw or processed) to the computing device(s) 940 as one or more log files.

The computing device(s) 940 can include processor(s) 942 and a memory 944 storing a training component 946.

In some instances, the training component 946 can include functionality to train one or more models to determine prediction information, as discussed herein. In some instances, the training component 946 can communicate information generated by the one or more models to the vehicle computing device(s) 904 to revise how to control the vehicle 902 in response to different situations.

For example, the training component 946 can train one or more machine learning models to generate the prediction component(s) discussed herein. In some examples, the training component 946 can include functionality to search data logs and determine attribute and/or location (e.g., in any one or more reference frames) information associated with object(s). Log data that corresponds to particular scenarios (e.g., a pedestrian approaching and crossing a crosswalk region, a pedestrian jaywalking, a target object rounding a bend with an offset from a centerline, and the like) can represent training data. The training data can be input to a machine learning model where a known result (e.g., a ground truth, such as the known "future" attributes) can be used to adjust weights and/or parameters of the machine learning model to minimize an error For instance, aspects of some or all of the components discussed herein can include any models, algorithms, and/or machine learned algorithms. For example, in some instances, the components in the memory 944 (and the memory 918, discussed above) can be implemented as a neural network. In some examples, the training component 946 can utilize a neural network to generate and/or execute one or more models to determine segmentation information from sensor data, as discussed herein.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 916 of the vehicle 902 and the processor(s) 942 of the computing device(s) 940 can be any suitable processor capable of executing instructions to process data and perform operations as described herein. By way of example and not limitation, the processor(s) 916 and 942 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 918 and 944 are examples of non-transitory computer-readable media. The memory 918 and 944 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 9 is illustrated as a distributed system, in alternative examples, components of the vehicle 902 can be associated with the computing device(s) 940 and/or components of the computing device(s) 940 can be associated with the vehicle 902. That is, the vehicle 902 can perform one or more of the functions associated with the computing device(s) 940, and vice versa. Further, aspects of the prediction component 928 (and subcomponents) can be performed on any of the devices discussed herein.

Figure 10:
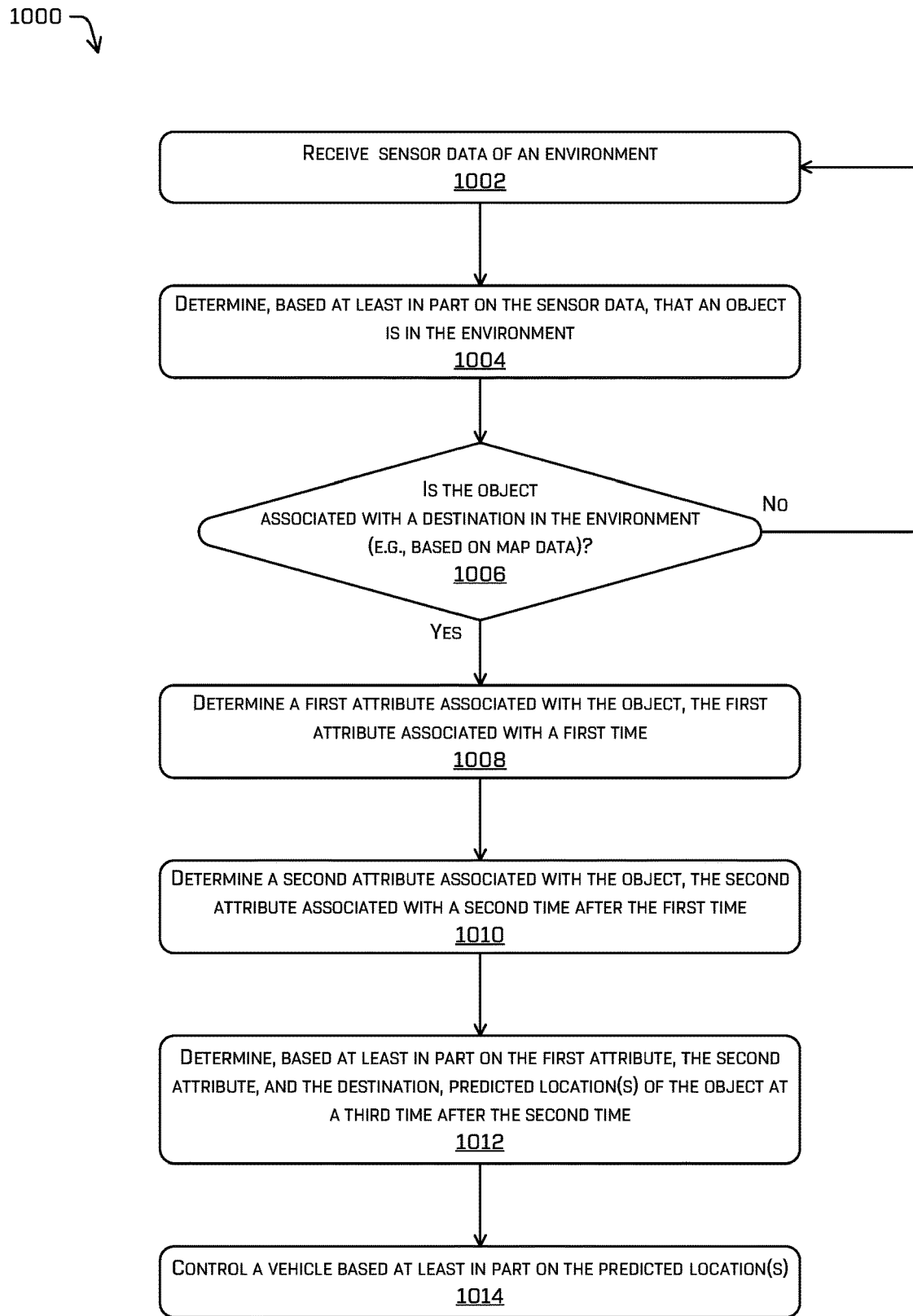
FIG. 10 depicts an example process for capturing sensor data, determining attributes associated with an object, determining a predicted location based on the attributes, and controlling a vehicle based on the predicted location.

FIG. 10 depicts an example process 1000 for capturing sensor data, determining attributes associated with an object, determining a predicted location based on the attributes, and controlling a vehicle based on the predicted location. For example, some or all of the process 1000 can be performed by one or more components in FIG. 9, as described herein. For example, some or all of the process 1000 can be performed by the vehicle computing device(s) 904. Further, any of the operations described in the example process 1000 may be executed in parallel, in a different order than depicted in the process 1000, omit any of the operations of the depicted process 1000, and/or be combined with any of the operations discussed herein.

At operation 1002, the process can include receiving sensor data of an environment. In some examples, the operation 1002 can include receiving and/or capturing time of flight data, lidar data, image data, radar data, and the like, of the environment. In some examples, the operation 1002 can be performed by a vehicle (e.g., an autonomous vehicle) as the vehicle traverses the environment.

At operation 1004, the process can include determining, based at least in part on the sensor data, that an object is in the environment. For example, the operation 1004 can include classifying an object as a pedestrian in the environment. In some examples, the operation 1004 can include determining whether the object (e.g., the pedestrian) is on a sidewalk, in a road, jaywalking, etc.

At operation 1006, the process can include determining whether the object is associated with a destination in the environment. For example, the operation 1006 can include accessing map data of the environment to determine whether crosswalk region(s) are within a threshold distance of the object. If there is one crosswalk region and the object is on a sidewalk, the operation 1006 can include identifying a location across a drivable area as a destination. If the object is in a street and is proximate to a single crosswalk, the operation 1006 can include disambiguating between two destinations. In some examples, the operation 1006 can include determining, based at least in part on attributes associated with the object, a likelihood that the object will approach and/or cross a particular crosswalk region. In some examples, the operation 1006 may provide such a destination regardless of the presence of a crosswalk region in proximity to the pedestrian.

In some examples, the operation 1006 can include inputting attribute(s) to a destination prediction component (e.g., the destination prediction component 320) to determine a destination associated with an object in the environment. In some examples, the attribute(s) input to the destination prediction component 320 can be the same as or similar to the attributes determined below in operations 1008 and 1010. In some examples, attribute(s) can be determined for an object before determining a destination in an environment. And in some instances, the attribute(s) can be determined in parallel using reference frames based on different destinations in the environment to determine a likely destination in the environment.

If the object is not associated with a destination (e.g., "no" in the operation 1006), the operation 1006 can continue to the operation 1002 to capture additional data in the environment.

If there the object is associated with a destination (e.g., "yes" in the operation 1006), the operation can continue to operation 1008.

At operation 1008, the process can include determining a first attribute associated with the object, the first attribute associated with a first time. In some examples, attributes can include, but are not limited to, one or more of a position of the object (e.g., a pedestrian) at a time (e.g., wherein the position can be represented in the frame of reference discussed herein), a size of the object or a bounding box associated with the object (e.g., length, width, and/or height), a velocity of the pedestrian at the time (e.g., a magnitude and/or angle with respect to the first axis (or other reference line)), an acceleration of the pedestrian at the time, an indication of whether the pedestrian is in a drivable area (e.g., whether the pedestrian is on a sidewalk or a road), an indication of whether the pedestrian is in a crosswalk region, an indication of whether the pedestrian is jaywalking, a region control indicator state (e.g., whether the crosswalk is controlled by a traffic signal and/or a state of the traffic signal), a vehicle context (e.g., a presence of a vehicle in the environment and attribute(s) associated with the vehicle), a flux through the crosswalk region over a period of time (e.g., a number of objects (e.g., vehicles and/or additional pedestrians) through the crosswalk region over a period of time), an object association (e.g., whether the pedestrian is travelling in a group of pedestrians), a distance to the crosswalk in a first direction (e.g., a global x-direction), a distance to a crosswalk in a second direction (e.g., a global y-direction), a distance to the road in the crosswalk region (e.g., a shortest distance to the road within the crosswalk region), distances to other objects, and the like.

At operation 1010, the process can include determining a second attribute associated with the object, the second attribute associated with a second time after the first time. In some examples, the operation 1010 can be omitted (such that only attributes associated with the first time can be determined and/or used), while in some instances, attributes associated with additional or different time instances can be determined as well.

At operation 1012, the process can include determining, based at least in part on the first attribute, the second attribute, and the destination, predicted location(s) of the object at a third time after the second time. In some examples, the operation 1012 can include inputting attribute information into a location prediction component (e.g., the location prediction component 404) and receiving as output predicted location(s) associated with the object in the environment. As discussed herein, in some examples, the attribute(s) and/or the predicted location(s) can be expressed in one or more frames of reference based at least in part on a location of the object at the first time and/or the second time and a location of the destination in the environment.

At operation 1014, the process can include controlling a vehicle based at least in part on the predicted location(s). In some instances, the operation 1014 can include generating a trajectory to stop the vehicle or to otherwise control the vehicle to safely traverse the environment.

Figure 11:
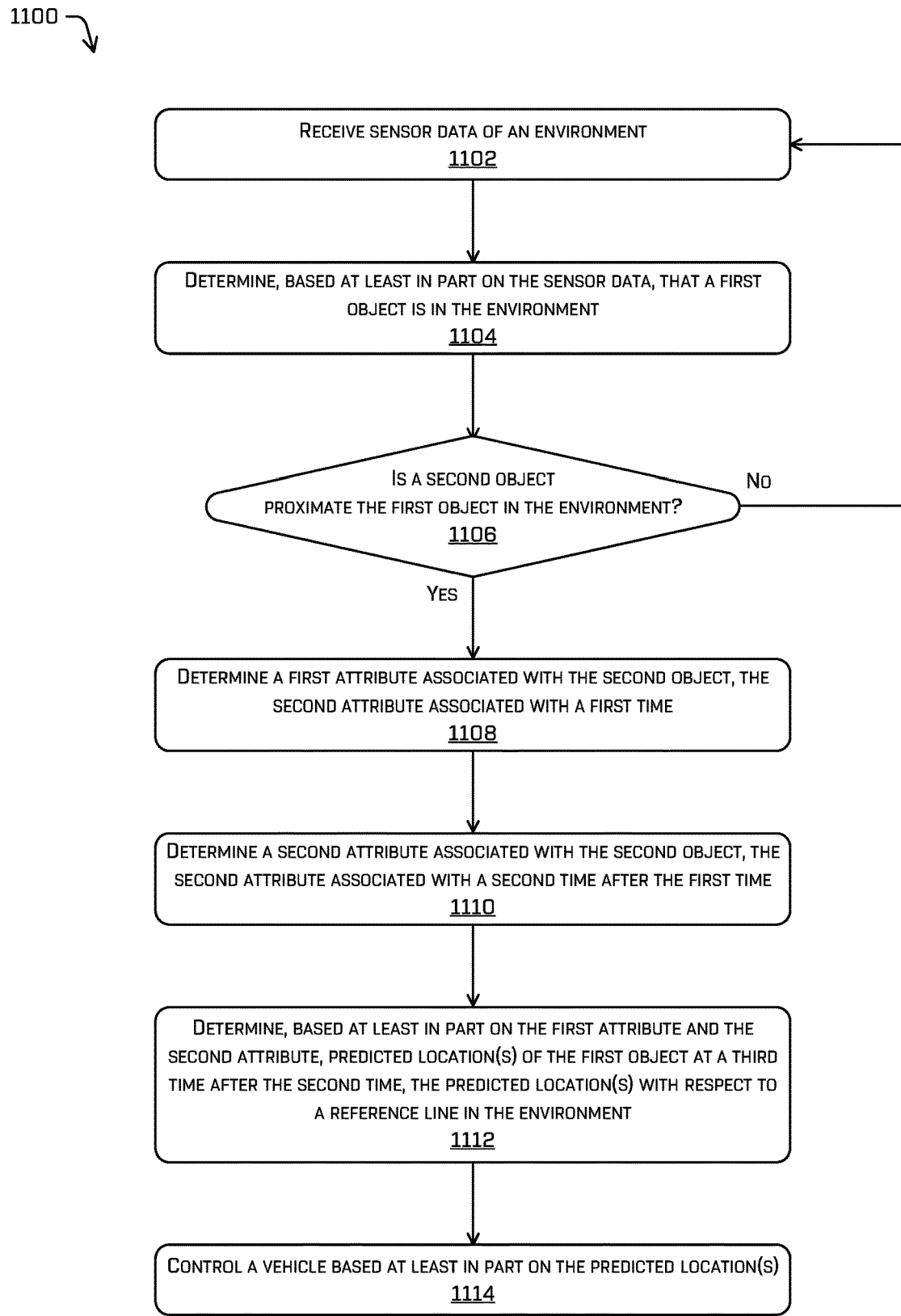
FIG. 11 depicts an example process for capturing sensor data, determining that a first object and second object are in an environment, determining attributes associated with the second object, determining a predicted location based on the attributes and a reference line, and controlling a vehicle based on the predicted location.

FIG. 11 depicts an example process for capturing sensor data, determining that a first object and second object are in an environment, determining attributes associated with the second object, determining a predicted location based on the attributes and a reference line, and controlling a vehicle based on the predicted location. For example, some or all of the process 1100 can be performed by one or more components in FIG. 9, as described herein. For example, some or all of the process 1100 can be performed by the vehicle computing device(s) 904. Further, any of the operations described in the example process 1100 may be executed in parallel, in a different order than depicted in the process 1100, omit any of the operations of the depicted process 1100, and/or be combined with any of the operations discussed herein.

At operation 1102, the process can include receiving sensor data of an environment. In some examples, the operation 1102 can include receiving and/or capturing time of flight data, lidar data, image data, radar data, and the like, of the environment. In some examples, the operation 1102 can be performed by a vehicle (e.g., an autonomous vehicle) as the vehicle traverses the environment.

At operation 1104, the process can include determining, based at least in part on the sensor data, that a first object is in the environment. For example, the operation 1104 can include determining a target object to be a subject of prediction operations, as discussed herein. For examples, determining the target object can include selecting an object from a plurality of objects in an environment as a target object. In some examples, a target object can be selected based on a likelihood of an intersection between paths of the target object and a vehicle (e.g., the vehicle 902) capturing sensor data, a distance between the target object and the vehicle (e.g., the vehicle 902) capturing sensor data, and the like.

At operation 1106, the process can include determining whether a second object is proximate the first object in the environment. In some examples, the operation 1106 can include determining whether the second object is within a threshold distance of the first object. In some examples (e.g., in a crowded environment), the operation 1106 can include determining the closest N objects to the first object (where N is an integer). In at least some examples, such determination may exclude objects having certain characteristics, such as, but not limited to, objects of differing classes, of opposing directions of motion, and the like.

If a second object is not proximate the first object (e.g., "no" in the operation 1106), the process can return to the operation 1102. However, in some examples, the process can continue to operation 1112 where predicted location(s) of the first object are determined without attribute(s) associated with the second object (e.g., predicted location(s) of the first object can be determined based at least in part on attribute(s) associated with the first object). That is, predicted location(s) of the first object can be determined irrespective of whether a second object is proximate the first object and/or irrespective of whether attribute(s) are determined for any second object, in some examples.

If a second object is proximate the first object (e.g., "yes" in the operation 1106), the process continues to operation 1108.

At operation 1108, the process can include determining a first attribute associated with the second object, the second attribute associated with a first time. In some examples, attributes can be determined for the first object, the second object, and/or other object(s) in the environment. For example, attributes can include, but are not limited to, one or more of a velocity of the object at a time, an acceleration of the object at the time, a position of the object at the time (e.g., in global or local coordinates), a bounding box associated with the object at the time (e.g., representing extent(s) of the object, roll, pitch, and/or yaw), a lighting state associated with the object at the first time (e.g., headlight(s), braking light(s), hazard light(s), turn indicator light(s), reverse light(s), etc.), object wheel orientation indication(s), a distance between the object and a map element at the time (e.g., a distance to a stop line, traffic line, speed bump, yield line, intersection, driveway, etc.), relative distances to other objects in one or more reference frames, a classification of the object (e.g., car, vehicle, animal, truck, bicycle, etc.), a characteristic associated with the object (e.g., whether the object is changing lanes, is a double parked vehicle, etc.), lane characteristics, and the like.

At operation 1110, the process can include determining a second attribute associated with the second object, the second attribute associated with a second time after the first time. In some examples, the operation 1110 can be omitted (such that only attributes associated with the first time can be used), while in some instance, attributes associated with additional or different time instances can be determined as well.

At operation 1112, the process can include determining, based at least in part on the first attribute and the second attribute, predicted location(s) of the first object at a third time after the second time, the predicted location(s) with respect to a reference line in the environment. In some examples, the operation 1112 can include inputting attribute information associated with the first object and/or the second object into a location prediction component (e.g., the location prediction component 802) to determine predicted location(s) associated with the first object.

In some examples, the operation 1112 can include receiving or otherwise determining a reference line most closely associated with the predicted location(s) and representing the predicted locations with respect to the reference line. For example, the operation 1112 can include determining a similarity score between predicted location(s) and candidate reference line(s) and selecting a reference line based on a similarity score, or any other mechanism.

At operation 1114, the process can include controlling a vehicle based at least in part on the predicted location(s). In some instances, the operation 1114 can include generating a trajectory to stop the vehicle or to otherwise control the vehicle to safely traverse the environment.

EXAMPLE CLAUSES

A: A system comprising: one or more processors; and one or more computer-readable media storing instructions executable by the one or more processors, wherein the instructions, when executed, cause the system to perform operations comprising: capturing sensor data of an environment using a sensor of an autonomous vehicle; determining, based at least in part on the sensor data, that an object is in the environment; determining, based at least in part on map data and the sensor data, that the object is associated with a destination in the environment; determining a first attribute associated with the object, the first attribute associated with a first time; determining a second attribute associated with the object, the second attribute associated with a second time after the first time; inputting the first attribute, the second attribute, and the destination to a machine learned model, wherein the first attribute and the second attribute are represented in a frame of reference based at least in part on the destination; receiving, from the machine learned model, a predicted location of the object at a third time after the second time; and controlling the autonomous vehicle based at least in part on the predicted location of the object in the environment at the third time.

B: The system of paragraph A, wherein the object is a pedestrian and the destination is associated with a perimeter of a crosswalk region in the environment and opposite a drivable surface associated with the pedestrian.

C: The system of paragraph A or B, the operations further comprising: determining that the object is associated with the destination based at least in part on inputting the first attribute and the second attribute into a destination prediction component; and receiving, from the destination prediction component, the destination, the destination prediction component comprising another machine learned model.

D: The system of any of paragraphs A-C, the operations further comprising: wherein the predicted location associated with the object at the third time comprises: a lateral offset based at least in part on the frame of reference; and a distance along an axis of the frame of reference representing a difference between a location of the object at the second time and the predicted location.

E: The system of any of paragraphs A-D, the operations further comprising: establishing the frame of reference, wherein: a first location of the object at the second time is associated with an origin of the frame of reference; a first axis is based at least in part on the origin and the destination;

and a second axis is perpendicular to the first axis; and wherein the predicted location is based at least in part on the frame of reference.

F: A method comprising: receiving sensor data representing an environment; determining, based at least in part on the sensor data, that an object is in the environment; determining a location in the environment, the location associated with a crosswalk region; determining a first attribute associated with the object, the first attribute associated with a first time; determining a second attribute associated with the object, the second attribute associated with a second time after the first time; inputting the first attribute, the second attribute, and the location to a machine learned model; and receiving, from the machine learned model, a predicted location associated with the object at a third time after the second time.

G: The method of paragraph F, further comprising: capturing the sensor data using a sensor on a vehicle; and controlling the vehicle based at least in part on the predicted location of the object in the environment at the third time.

H: The method of paragraph F or G, wherein the location is a first location, the method further comprising: determining the first location based at least in part on at least one of map data or the sensor data representing the environment; determining a threshold region associated with the first location; determining a second location of the object in the environment; determining that the second location of the object is within the threshold region; and selecting, based at least in part on the second location being within the threshold region and at least one of the first attribute or the second attribute, the location as a destination associated with the object.

I: The method of any of paragraphs F-H, wherein the location is a first location, the method further comprising: establishing a frame of reference, wherein: a second location of the object at the second time is associated with an origin of the frame of reference; a first axis is based at least in part on the origin and the first location; and a second axis is perpendicular to the first axis; and wherein the first attribute is based at least in part on the frame of reference.

J: The method of paragraph I, further comprising: determining a velocity of the object at the second time; and determining an angle between a velocity vector representing the velocity and the first axis; wherein the second attribute comprises the angle.

K: The method of paragraph I or J, wherein: the location is a first location; and the predicted location associated with the object at the third time comprises a lateral offset with respect to the second axis and a distance along the first axis representing a difference between a second location of the object at the second time and the predicted location.

L: The method of any of paragraphs F-K, further comprising: determining a number of objects entering the crosswalk region within a period of time, wherein the second attribute comprises the number of objects.

M: The method of any of paragraphs F-L, wherein the object is a first object, the method further comprising: determining, based at least in part on the sensor data, that a second object is in the environment; determining, as an object context, at least one of a position, a velocity, or an acceleration associated with the second object; and determining the predicted location associated with the object further based at least in part on the object context.

N: The method of any of paragraphs F-M, further comprising: binning at least a portion of the predicted location to determine a binned predicted location.

O: The method of any of paragraphs F-N, wherein the first attribute comprises at least one of: a position of the object at the first time; a velocity of the object at the first time; a heading of the object at the first time; a first distance between the object at the first time and a first portion of the crosswalk region; a second distance between the object at the first time and a second portion of the crosswalk region; an acceleration of the object at the first time; an indication of whether the object is in a drivable area; a region control indicator state; a vehicle context; or an object association.

P: A non-transitory computer-readable medium storing instructions that, when executed, cause one or more processors to perform operations comprising: receiving sensor data representing an environment; determining, based at least in part on the sensor data, that an object is in the environment; determining a location in the environment, the location associated with at least one of a crosswalk region or a non-drivable region of the environment; determining a first attribute associated with the object, the first attribute associated with a first time; determining a second attribute associated with the object, the second attribute associated with a second time after the first time; inputting the first attribute, the second attribute, and the location to a machine learned model; and receiving, from the machine learned model, a predicted location associated with the object at a third time after the second time.

Q: The non-transitory computer-readable medium of paragraph P, wherein the location is a first location, the operations further comprising: determining the first location based at least in part on at least one of map data representing the environment or the sensor data representing the environment; determining a threshold region associated with the first location; determining a second location of the object in the environment; determining that the second location of the object is within the threshold region; and selecting, based at least in part on the second location of the object being within the threshold region and at least one of the first attribute or the second attribute, the first location as a destination associated with the object.

R: The non-transitory computer-readable medium of paragraph P or Q, wherein the location is a first location, the operations further comprising: establishing a frame of reference, wherein: a second location of the object at the second time is associated with an origin of the frame of reference; a first axis is based at least in part on the origin and the first location; and a second axis is perpendicular to the first axis; and wherein the first attribute is based at least in part on the frame of reference.

S: The non-transitory computer-readable medium of paragraph R, wherein: the location is a first location; and the predicted location associated with the object at the third time comprises a lateral offset along the second axis and a distance along the first axis representing a difference between a second location of the object at the second time and the predicted location.

T: The non-transitory computer-readable medium of any of paragraphs P-S, further comprising: determining that the object is not associated with the crosswalk region; and determining that the location is associated with the non-drivable region of the environment.

U: A system comprising: one or more processors; and one or more computer-readable media storing instructions executable by the one or more processors, wherein the instructions, when executed, cause the system to perform operations comprising: capturing sensor data of an environment using a sensor of an autonomous vehicle; determining, based at least in part on the sensor data, that an object is in the environment; receiving a reference line associated with the object in the environment; determining a first attribute associated with the object, the first attribute associated with a first time; determining a second attribute associated with the object, the second attribute associated with a second time after the first time; inputting the first attribute, the second attribute, and the reference line into a machine learned model; receiving, from the machine learned model, a predicted location of the object at a third time after the second time, the predicted location with respect to the reference line in the environment; and controlling the autonomous vehicle based at least in part on the predicted location of the object in the environment at the third time.

V: The system of paragraph U, wherein the object is a first object, the operations further comprising: determining a third attribute associated with a second object proximate the first object, the third attribute associated with the first time; determining a fourth attribute associated with the second object, the fourth attribute associated with the second time; and inputting the third attribute and the fourth attribute to the machine learned model to determine the predicted location of the first object at the third time.

W: The system of paragraph V, wherein the at least one of the first attribute, the second attribute, the third attribute, or the fourth attribute comprises at least one of: a velocity of the second object at the first time; an acceleration of the second object at the first time; a position of the second object at the first time; a bounding box associated with the second object at the first time; a lighting state associated with the second object at the first time; a first distance between the second object and a map element at the first time; a second distance between the first object and the second object; a classification of the second object; or a characteristic associated with the second object.

X: The system of any of paragraphs U-W, wherein the predicted location comprises a distance along the reference line and a lateral offset from the reference line.

Y: The system of any of paragraphs U-X, wherein the machine learned model is a first machine learned model, and wherein the reference line is received from a second machine learned model trained to output reference lines.

Z: A method comprising: receiving sensor data representing an environment; determining that an object is in the environment; receiving a reference line associated with the object; determining a first attribute associated with the object, the first attribute associated with a first time; determining a second attribute associated with the object, the second attribute associated with a second time after the first time; inputting the first attribute, the second attribute, and the reference line to a machine learned model; and receiving, from the machine learned model, a predicted location of the object at a third time after the second time, the predicted location with respect to the reference line in the environment.

AA: The method of paragraph Z, further comprising: capturing the sensor data using a sensor of a vehicle; and controlling the vehicle based at least in part on the predicted location of the object in the environment at the third time.

AB: The method of paragraph AA, wherein the object is one of a plurality of objects in the environment, the method further comprising: selecting the object as a target object based at least in part on a distance between the object and the vehicle in the environment.

AC: The method of any of paragraphs Z-AB, wherein the object is one of a plurality of objects in the environment, and wherein the object is a target object, the method further comprising: selecting, based at least in part on a proximity of the plurality of objects to the target object, a number of objects of the plurality of object; determining attributes associated with the objects; and inputting the attributes to the machine learned model to determine the predicted location.

AD: The method of paragraph AC, further comprising selecting the objects based at least in part on a classification associated with the objects.

AE: The method of any of paragraphs Z-AD, wherein the reference line corresponds to a centerline of a drivable area, and wherein the predicted location comprises a distance along the reference line and a lateral offset from the reference line.

AF: The method of any of paragraphs Z-AE, wherein the first attribute and the second attribute are represented with respect to a frame of reference, wherein an origin of the frame of reference is based at least in part on a location of the object at the second time.

AG: The method of any of paragraphs Z-AF, wherein the first attribute comprises at least one of: a velocity of the object at the first time; an acceleration of the object at the first time; a position of the object at the first time; a bounding box associated with the object at the first time; a lighting state associated with the object at the first time; a distance between the object and a map element at the first time; a classification of the object; or a characteristic associated with the object.

AH: The method of paragraph AG, wherein the object is a first object and the distance is a first distance, the method further comprising: determining that a second object is proximate the first object in the environment; wherein the first attribute further comprises a second distance between the first object and the second object at the first time.

AI: A non-transitory computer-readable medium storing instructions that, when executed, cause one or more processors to perform operations comprising: receiving sensor data representing an environment; determining, based at least in part on the sensor data, that an object is in the environment; receiving a reference line associated with the object; determining a first attribute associated with the object, the first attribute associated with a first time; determining a second attribute associated with the object, the second attribute associated with a second time after the first time; inputting the first attribute, the second attribute, and the reference line to a machine learned model; and receiving, from the machine learned model, a predicted location of the object at a third time after the second time, the predicted location with respect to the reference line in the environment.

AJ: The non-transitory computer-readable medium of paragraph AI, wherein the object is a first object, the operations further comprising: determining that a second object is proximate the first object in the environment; determining a third attribute associated with the second object, the third attribute associated with the first time; determining a fourth attribute associated with the second object, the fourth attribute associated with the second time; and inputting the third attribute and the fourth attribute to the machine learned model to determine the predicted location associated with the first object.

AK: The non-transitory computer-readable medium of paragraph AI or AJ, the first attribute and the second attribute are represented with respect to a frame of reference, wherein an origin of the frame of reference is based at least in part on a location of the object at the second time.

AL: The non-transitory computer-readable medium of paragraph AK, wherein the predicted location is represented as a distance along the reference line and a lateral offset from the reference line.

AM: The non-transitory computer-readable medium of any of paragraphs AI-AL, wherein the first attribute comprises at least one of: a velocity of the object at the first time; an acceleration of the object at the first time; a position of the object at the first time; a bounding box associated with the object at the first time; a lighting state associated with the object at the first time; a distance between the object and a map element at the first time; a classification of the object; or a characteristic associated with the object.

AN: The non-transitory computer-readable medium of paragraph AM, wherein the object is a first object, the distance is a first distance, and the first attribute further comprises a second distance between the first object and a second object at the first time.

While the example clauses described above are described with respect to one particular implementation, it should be understood that, in the context of this document, the content of the example clauses can also be implemented via a method, device, system, a computer-readable medium, and/or another implementation.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
      capturing sensor data of an environment using a sensor of an autonomous vehicle;
      determining, based at least in part on the sensor data, that an object is in the environment;
      determining, based at least in part on map data and the sensor data, that the object is associated with a destination in the environment;
      determining a first attribute associated with the object, the first attribute associated with a first time;
      determining a second attribute associated with the object, the second attribute associated with a second time after the first time;
      inputting the first attribute, the second attribute, and the destination to a machine learned model, wherein the first attribute and the second attribute are represented in a frame of reference based at least in part on the destination;
      receiving, from the machine learned model, a predicted location of the object at a third time after the second time; and
      controlling the autonomous vehicle based at least in part on the predicted location of the object in the environment at the third time.

2. The system of claim 1, wherein the object is a pedestrian and the destination is associated with a perimeter of a crosswalk region in the environment and opposite a drivable surface associated with the pedestrian.

3. The system of claim 1, the operations further comprising:
   determining that the object is associated with the destination based at least in part on inputting the first attribute and the second attribute into a destination prediction component; and
   receiving, from the destination prediction component, the destination, the destination prediction component comprising another machine learned model.

4. The system of claim 1, the operations further comprising:
   wherein the predicted location associated with the object at the third time comprises:
      a lateral offset based at least in part on the frame of reference; and
      a distance along an axis of the frame of reference representing a difference between a location of the object at the second time and the predicted location.

5. The system of claim 1, the operations further comprising:
   establishing the frame of reference, wherein:
      a first location of the object at the second time is associated with an origin of the frame of reference;
      a first axis is based at least in part on the origin and the destination; and
      a second axis is perpendicular to the first axis; and
   wherein the predicted location is based at least in part on the frame of reference.

6. A method comprising:
   receiving sensor data representing an environment;
   determining, based at least in part on the sensor data, that an object is in the environment;
   determining a location in the environment, the location associated with a crosswalk region;
   determining a first attribute associated with the object, the first attribute associated with a first time;
   determining a second attribute associated with the object, the second attribute associated with a second time after the first time;
   inputting the first attribute, the second attribute, and the location to a machine learned model, wherein the first attribute and the second attribute are represented in a frame of reference based at least in part on the location; and
   receiving, from the machine learned model, a predicted location associated with the object at a third time after the second time.

7. The method of claim 6, further comprising:
capturing the sensor data using a sensor on a vehicle; and
controlling the vehicle based at least in part on the predicted location of the object in the environment at the third time.

8. The method of claim 6, wherein the location is a first location, the method further comprising:
determining the first location based at least in part on at least one of map data or the sensor data representing the environment;
determining a threshold region associated with the first location;
determining a second location of the object in the environment;
determining that the second location of the object is within the threshold region; and
selecting, based at least in part on the second location being within the threshold region and at least one of the first attribute or the second attribute, the location as a destination associated with the object.

9. The method of claim 6, wherein the location is a first location, the method further comprising:
establishing the frame of reference, wherein:
a second location of the object at the second time is associated with an origin of the frame of reference;
a first axis is based at least in part on the origin and the first location; and
a second axis is perpendicular to the first axis; and
wherein the first attribute is based at least in part on the frame of reference.

10. The method of claim 9, further comprising:
determining a velocity of the object at the second time; and
determining an angle between a velocity vector representing the velocity and the first axis;
wherein the second attribute comprises the angle.

11. The method of claim 9, wherein:
the location is a first location; and
the predicted location associated with the object at the third time comprises a lateral offset with respect to the second axis and a distance along the first axis representing a difference between a second location of the object at the second time and the predicted location.

12. The method of claim 6, further comprising:
determining a number of objects entering the crosswalk region within a period of time, wherein the second attribute comprises the number of objects.

13. The method of claim 6, wherein the object is a first object, the method further comprising:
determining, based at least in part on the sensor data, that a second object is in the environment;
determining, as an object context, at least one of a position, a velocity, or an acceleration associated with the second object; and
determining the predicted location associated with the object further based at least in part on the object context.

14. The method of claim 6, further comprising:
binning at least a portion of the predicted location to determine a binned predicted location.

15. The method of claim 6, wherein the first attribute comprises at least one of:
a position of the object at the first time;
a velocity of the object at the first time;
a heading of the object at the first time;
a first distance between the object at the first time and a first portion of the crosswalk region;
a second distance between the object at the first time and a second portion of the crosswalk region;
an acceleration of the object at the first time;
an indication of whether the object is in a drivable area;
a region control indicator state;
a vehicle context; or
an object association.

16. One or more non-transitory computer-readable media storing instructions that, when executed, cause one or more processors to perform operations comprising:
receiving sensor data representing an environment;
determining, based at least in part on the sensor data, that an object is in the environment;
determining a location in the environment, the location associated with at least one of a crosswalk region or a non-drivable region of the environment;
determining a first attribute associated with the object, the first attribute associated with a first time;
determining a second attribute associated with the object, the second attribute associated with a second time after the first time;
inputting the first attribute, the second attribute, and the location to a machine learned model, wherein the first attribute and the second attribute are represented in a frame of reference based at least in part on the location; and
receiving, from the machine learned model, a predicted location associated with the object at a third time after the second time.

17. The one or more non-transitory computer-readable media of claim 16, wherein the location is a first location, the operations further comprising:
determining the first location based at least in part on at least one of map data representing the environment or the sensor data representing the environment;
determining a threshold region associated with the first location;
determining a second location of the object in the environment;
determining that the second location of the object is within the threshold region; and
selecting, based at least in part on the second location of the object being within the threshold region and at least one of the first attribute or the second attribute, the first location as a destination associated with the object.

18. The one or more non-transitory computer-readable media of claim 16, wherein the location is a first location, the operations further comprising:
establishing the frame of reference, wherein:
a second location of the object at the second time is associated with an origin of the frame of reference;
a first axis is based at least in part on the origin and the first location; and
a second axis is perpendicular to the first axis; and
wherein the first attribute is based at least in part on the frame of reference.

19. The one or more non-transitory computer-readable media of claim 18, wherein:
the location is a first location; and
the predicted location associated with the object at the third time comprises a lateral offset along the second axis and a distance along the first axis representing a difference between a second location of the object at the second time and the predicted location.

20. The one or more non-transitory computer-readable media of claim 16, further comprising:
   determining that the object is not associated with the crosswalk region; and
   determining that the location is associated with the non-drivable region of the environment.

\* \* \* \* \*

UNITED STATES PATENT AND TRADEMARK OFFICE
CERTIFICATE OF CORRECTION

| | | |
|---|---|---|
| PATENT NO. | : 11,021,148 B2 | Page 1 of 1 |
| APPLICATION NO. | : 16/363541 | |
| DATED | : June 1, 2021 | |
| INVENTOR(S) | : Mahsa Ghafarianzadeh et al. | |

It is certified that error appears in the above-identified patent and that said Letters Patent is hereby corrected as shown below:

On the Title Page

Item [73], change Assignee: Zoox, Inc., Foster, CA (US) to Zoox, Inc., Foster City, CA (US).

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*